(12) United States Patent
Sasaki et al.

(10) Patent No.: US 9,218,835 B1
(45) Date of Patent: Dec. 22, 2015

(54) THERMALLY-ASSISTED MAGNETIC RECORDING HEAD INCLUDING A HEAT SINK

(71) Applicants: Yoshitaka Sasaki, Santa Clara, CA (US); Hiroyuki Ito, Milpitas, CA (US); Kazuki Sato, Milpitas, CA (US); Yukinori Ikegawa, Milpitas, CA (US); Seiichiro Tomita, Milpitas, CA (US); Hideo Mamiya, Milpitas, CA (US)

(72) Inventors: Yoshitaka Sasaki, Santa Clara, CA (US); Hiroyuki Ito, Milpitas, CA (US); Kazuki Sato, Milpitas, CA (US); Yukinori Ikegawa, Milpitas, CA (US); Seiichiro Tomita, Milpitas, CA (US); Hideo Mamiya, Milpitas, CA (US)

(73) Assignee: HEADWAY TECHNOLOGIES, INC., Milpitas ( * ) Notice: Subject to any disclaimer, the term of this patent is extended or adjusted under 35 U.S.C. 154(b) by 0 days.

(21) Appl. No.: 14/475,090

(22) Filed: Sep. 2, 2014

(51) Int. Cl.
| G11B 11/00 | (2006.01) |
| G11B 5/48 | (2006.01) |
| G11B 5/00 | (2006.01) |
| G11B 5/17 | (2006.01) |
| G11B 5/31 | (2006.01) |
| G11B 5/60 | (2006.01) |

(52) U.S. Cl.
CPC ............... *G11B 5/4866* (2013.01); *G11B 5/17* (2013.01); *G11B 5/314* (2013.01); *G11B 5/6088* (2013.01); *G11B 2005/001* (2013.01); *G11B 2005/0021* (2013.01)

(58) Field of Classification Search
None
See application file for complete search history.

(56) References Cited

U.S. PATENT DOCUMENTS

| 8,456,968 | B1 | 6/2013 | Sasaki et al. |
| 8,462,594 | B1 | 6/2013 | Aoki et al. |
| 8,482,879 | B1 | 7/2013 | Sasaki et al. |
| 8,493,821 | B1 | 7/2013 | Sasaki et al. |
| 8,498,183 | B1 | 7/2013 | Sasaki et al. |
| 8,614,932 | B1 | 12/2013 | Sasaki et al. |
| 8,711,663 | B1 | 4/2014 | Sasaki et al. |
| 8,760,809 | B1 | 6/2014 | Sasaki et al. |
| 8,923,100 | B1 * | 12/2014 | Wessel ................. G11B 5/6088 369/112.27 |
| 2011/0002199 | A1 | 1/2011 | Takayama et al. |
| 2011/0038236 | A1 | 2/2011 | Mizuno et al. |
| 2011/0058272 | A1 | 3/2011 | Miyauchi et al. |
| 2011/0116349 | A1 | 5/2011 | Komura et al. |
| 2011/0170381 | A1 | 7/2011 | Matsumoto |
| 2011/0176398 | A1 | 7/2011 | Tanaka et al. |
| 2011/0222184 | A1 | 9/2011 | Komura et al. |
| 2013/0294208 | A1 * | 11/2013 | Peng .................... G11B 5/3133 369/13.31 |
| 2015/0043316 | A1 * | 2/2015 | Rea ........................ G11B 5/314 369/13.33 |

OTHER PUBLICATIONS

Jul. 2, 2014 Office Action issued in U.S. Appl. No. 14/021,365.
U.S. Appl. No. 14/209,262 in the name of Yoshitaka Sasaki et al filed Mar. 13, 2014.
U.S. Appl. No. 14/335,528 in the name of Yoshitaka Sasaki et al filed Jul. 18, 2014.
U.S. Appl. No. 14/021,365 in the name of Yoshitaka Sasaki et al filed Sep. 9, 2013.

* cited by examiner

*Primary Examiner* — Dionne Pendleton
(74) *Attorney, Agent, or Firm* — Oliff PLC

(57) ABSTRACT

A thermally-assisted magnetic recording head includes a main pole and a heat sink. The heat sink includes two first portions and two second portions. The two first portions are located on opposite sides of the main pole in the track width direction and are each spaced from the main pole. The two second portions are located between the main pole and the two first portions. The main pole and the two first portions are each formed of a magnetic metal. The two second portions are formed of a nonmagnetic metal.

9 Claims, 24 Drawing Sheets

THERMALLY-ASSISTED MAGNETIC RECORDING HEAD INCLUDING A HEAT SINK

BACKGROUND OF THE INVENTION

1. Field of the Invention

The present invention relates to a thermally-assisted magnetic recording head for use in thermally-assisted magnetic recording to write data on a recording medium with the coercivity thereof lowered by irradiating the recording medium with near-field light.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider configured to slightly fly above the surface of a recording medium. The slider has a medium facing surface configured to face the recording medium. The medium facing surface has an air inflow end (a leading end) and an air outflow end (a trailing end).

Here, the side of the positions closer to the leading end relative to a reference position will be defined as the leading side, and the side of the positions closer to the trailing end relative to the reference position will be defined as the trailing side. The leading side is the rear side in the direction of travel of the recording medium relative to the slider. The trailing side is the front side in the direction of travel of the recording medium relative to the slider.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

U.S. Patent Application Publication Nos. 2011/0058272 A1 and 2011/0170381 A1, and U.S. Pat. No. 8,614,932 B1 each disclose a technology in which the surface of the core of the waveguide and the surface of the plasmon generator are arranged to face each other with a gap therebetween, so that evanescent light that occurs from the surface of the core based on the light propagating through the core is used to excite surface plasmons on the plasmon generator to generate near-field light based on the excited surface plasmons.

A thermally-assisted magnetic recording head that employs a plasmon generator as a source of generation of near-field light is configured so that the write head unit includes a coil, a main pole and the plasmon generator. The coil is configured to produce a magnetic field corresponding to data to be written on a recording medium. The main pole has an end face located in the medium facing surface. The main pole is configured to allow a magnetic flux corresponding to the magnetic field produced by the coil to pass, and configured to produce a write magnetic field from the aforementioned end face. The plasmon generator includes a near-field light generating part located in the medium facing surface. It is required of the thermally-assisted magnetic recording head that the end face of the main pole and the near-field light generating part of the plasmon generator be located in close proximity to each other.

Thermally-assisted magnetic recording heads are being often used in high-end, large-capacity magnetic disk drives typified by those for cloud computing business. Highly reliable thermally-assisted magnetic recording heads applicable to high-end, large-capacity magnetic disk drives are thus in demand.

However, thermally-assisted magnetic recording heads suffer from the problem that heat generated by the plasmon generator causes corrosion of the main pole, and thereby reduces the life of the thermally-assisted magnetic recording head. Corrosion of the main pole occurs as follows. The heat generated by the plasmon generator is transferred to the main pole through the inside of the head and/or through the recording medium. As a result, the main pole gets hot. The hot main pole chemically reacts with atmospheric oxygen and moisture, and thereby suffers corrosion.

One of solutions to the aforementioned problem is to provide a heat sink around the main pole. U.S. Patent Application Publication No. 2011/0170381 A1 discloses a thermally-assisted magnetic recording head with two metal layers of a nonmagnetic metal disposed on opposite sides of the main pole in the track width direction. This thermally-assisted magnetic recording head will hereinafter be referred to as the conventional head.

In order to improve the heat dissipation performance of the two metal layers in the conventional head, it is necessary to increase the volume of the two metal layers and the areas of respective end faces of the two metal layers exposed in the medium facing surface. However, the conventional head has encountered the following first and second problems.

The first problem is that because the two metal layers formed of a different material from that of the main pole extend broadly around the main pole, large stresses may be generated on the two metal layers to cause them to peel away and/or cause damage to the plasmon generator located near the two metal layers.

The second problem is increased cost of the head. Suitable materials for the two metal layers are nonmagnetic metals having high thermal conductivity. Examples of the nonmagnetic metals having high thermal conductivity include a noble metal such as Au or Ag. However, the use of such a noble metal to form the two metal layers of large volume increases the cost of the head.

OBJECT AND SUMMARY OF THE INVENTION

It is an object of the present invention to provide a thermally-assisted magnetic recording head capable of preventing the problem that will result from forming a heat sink for the main pole from a nonmagnetic metal only, and capable of improving the heat dissipation performance of the heat sink.

A thermally-assisted magnetic recording head of the present invention includes: a medium facing surface configured to face a recording medium; a coil configured to produce a magnetic field corresponding to data to be written on the recording medium; a main pole; a waveguide; a plasmon generator; and a heat sink. The main pole has a first end face located in the medium facing surface. The main pole is configured to allow a magnetic flux that corresponds to the magnetic field produced by the coil to pass, and configured to produce a write magnetic field for writing data on the recording medium. The waveguide includes a core through which light propagates, and a cladding provided around the core. The plasmon generator includes a near-field light generating part located in the medium facing surface.

The first end face and the near-field light generating part are located at positions that are different from each other in the direction of travel of the recording medium. The plasmon generator is configured so that a surface plasmon is excited on the plasmon generator based on the light propagating through the core, and the near-field light generating part generates near-field light based on the surface plasmon.

The heat sink includes at least one first portion and at least one second portion, each of the at least one first portion and the at least one second portion having an end face located in the medium facing surface. The at least one first portion is located on an outward side of the main pole in the track width direction and spaced from the main pole. At least part of the at least one second portion is located between the main pole and the at least one first portion. Each of the main pole and the at least one first portion is formed of a magnetic metal. The at least one second portion is formed of a nonmagnetic metal.

In the thermally-assisted magnetic recording head of the present invention, the magnetic metal used to form the main pole and the magnetic metal used to form the at least one first portion may be the same.

In the thermally-assisted magnetic recording head of the present invention, the nonmagnetic metal may be one of Au, Ag, Al, Cu, Mo, W, Ir, Ru, Rh, Cr, Pd, and Pt.

In the thermally-assisted magnetic recording head of the present invention, the core may have an evanescent light generating surface configured to generate evanescent light based on the light propagating through the core, and the plasmon generator may include a plasmon exciting part located at a predetermined distance from the evanescent light generating surface and facing the evanescent light generating surface. In this case, in the plasmon generator, a surface plasmon is excited on the plasmon exciting part through coupling with the evanescent light generated by the evanescent light generating surface, the surface plasmon propagates to the near-field light generating part, and the near-field light generating part generates near-field light based on the surface plasmon.

In the thermally-assisted magnetic recording head of the present invention, the at least one first portion may be two first portions that are located on opposite sides of the main pole in the track width direction and are each spaced from the main pole. The at least one second portion may be two second portions, at least part of each of the two second portions being located between the main pole and a corresponding one of the two first portions.

Where the heat sink includes the two first portions and the two second portions, the thermally-assisted magnetic recording head of the present invention may further include a shield formed of a magnetic material and a return path section formed of a magnetic material. The shield has a second end face located in the medium facing surface. The return path section connects the main pole and the shield to each other, and allows a magnetic flux corresponding to the magnetic field produced by the coil to pass. The first end face and the second end face are located at positions that are different from each other in the direction of travel of the recording medium. The near-field light generating part is located between the first end face and the second end face.

The return path section includes a first yoke portion, a second yoke portion, a first columnar portion, a second columnar portion, and a third columnar portion. The first yoke portion, the second yoke portion and the first columnar portion are located on the same side in the direction of travel of the recording medium relative to the core. The first columnar portion is located away from the medium facing surface and has a first end and a second end opposite to each other in the direction of travel of the recording medium. The second and third columnar portions are located closer to the medium facing surface than is the first columnar portion. The first yoke portion connects the main pole to the first end of the first columnar portion. The second columnar portion and the third columnar portion are located on opposite sides of the plasmon generator in the track width direction, and connected to the shield. The second yoke portion is connected to the second end of the first columnar portion, and connected to the shield via the second and third columnar portions. The coil is wound around the first columnar portion. The second and third columnar portions constitute the two first portions.

Where the thermally-assisted magnetic recording head of the present invention includes the shield and the return path section, the core may have a front end face facing toward the medium facing surface, the front end face having a first edge and a second edge opposite to each other in the direction of travel of the recording medium. The first edge is located closer to the near-field light generating part than is the second edge. When the front end face of the core is divided into two regions: a first region extending from the midpoint position between the first edge and the second edge to the first edge; and a second region extending from the midpoint position to the second edge, the shield may overlap only the first region of the front end face when viewed in a direction perpendicular to the medium facing surface.

The shield may include a first non-overlapping portion and a second non-overlapping portion that are located on opposite sides of the front end face of the core in the track width direction when viewed in the direction perpendicular to the medium facing surface. In this case, the second columnar portion is connected to the first non-overlapping portion, and the third columnar portion is connected to the second non-overlapping portion. The first end face and the second end face may be at a distance of 50 to 300 nm from each other.

The thermally-assisted magnetic recording head of the present invention allows for the use of a smaller amount of nonmagnetic metal to form a heat sink for the main pole than in the case of forming the heat sink from a nonmagnetic metal only. The present invention thus makes it possible to prevent the problem that will result from forming the heat sink for the main pole from a nonmagnetic metal only.

Further, the thermally-assisted magnetic recording head of the present invention allows for improving the efficiency for cooling the main pole by providing a large total volume of the at least one first portion and the at least one second portion and a large total area of the end face of the at least one first portion and the end face of the at least one second portion even if the at least one second portion is small in volume and the end face of the at least one second portion is small in area.

Other and further objects, features and advantages of the present invention will appear more fully from the following description.

DETAILED DESCRIPTION OF THE PREFERRED EMBODIMENTS

First Embodiment

Figure 1:
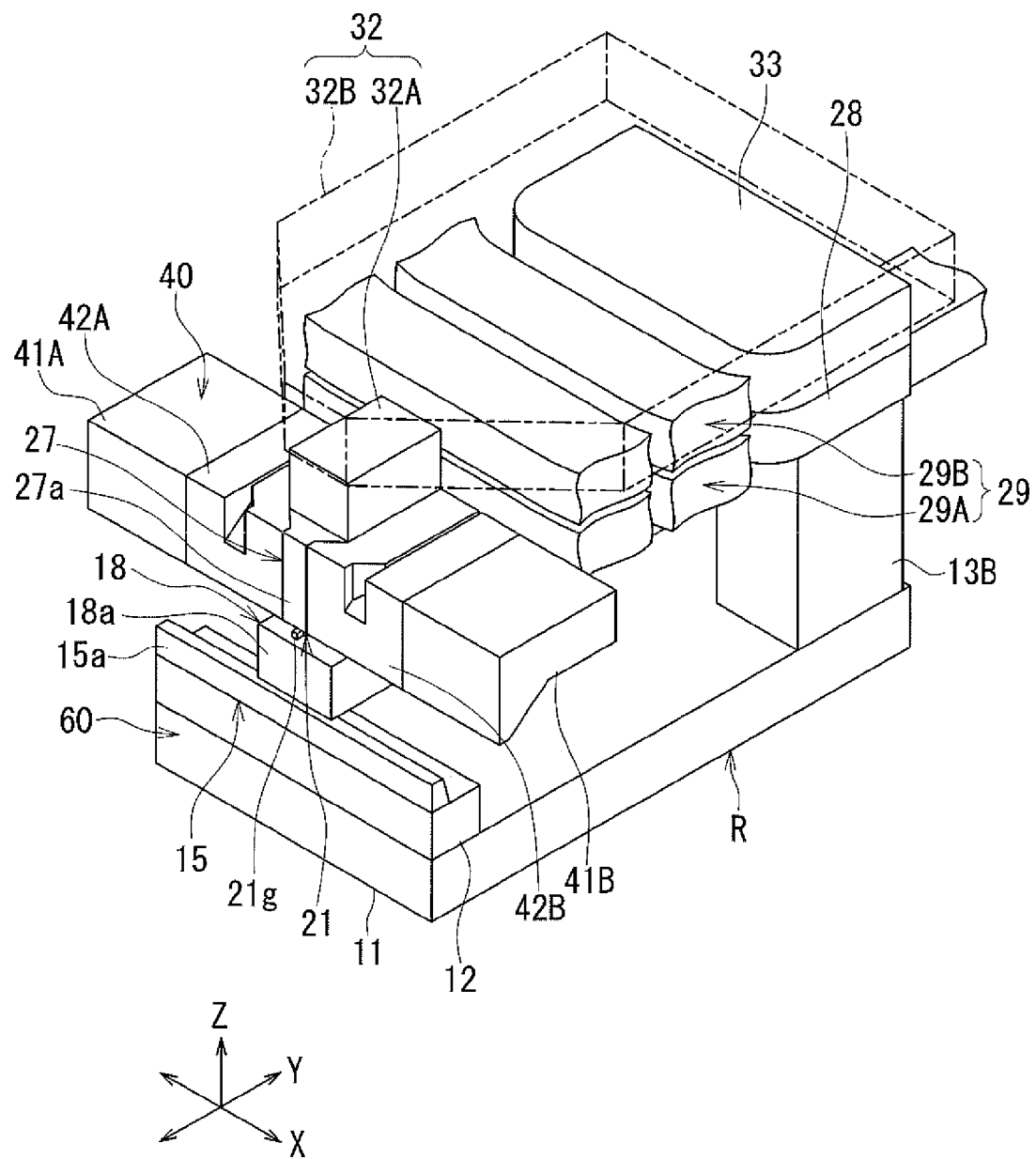
FIG. 1 is a perspective view showing the main part of a thermally-assisted magnetic recording head according to a first embodiment of the invention.
Figure 2:
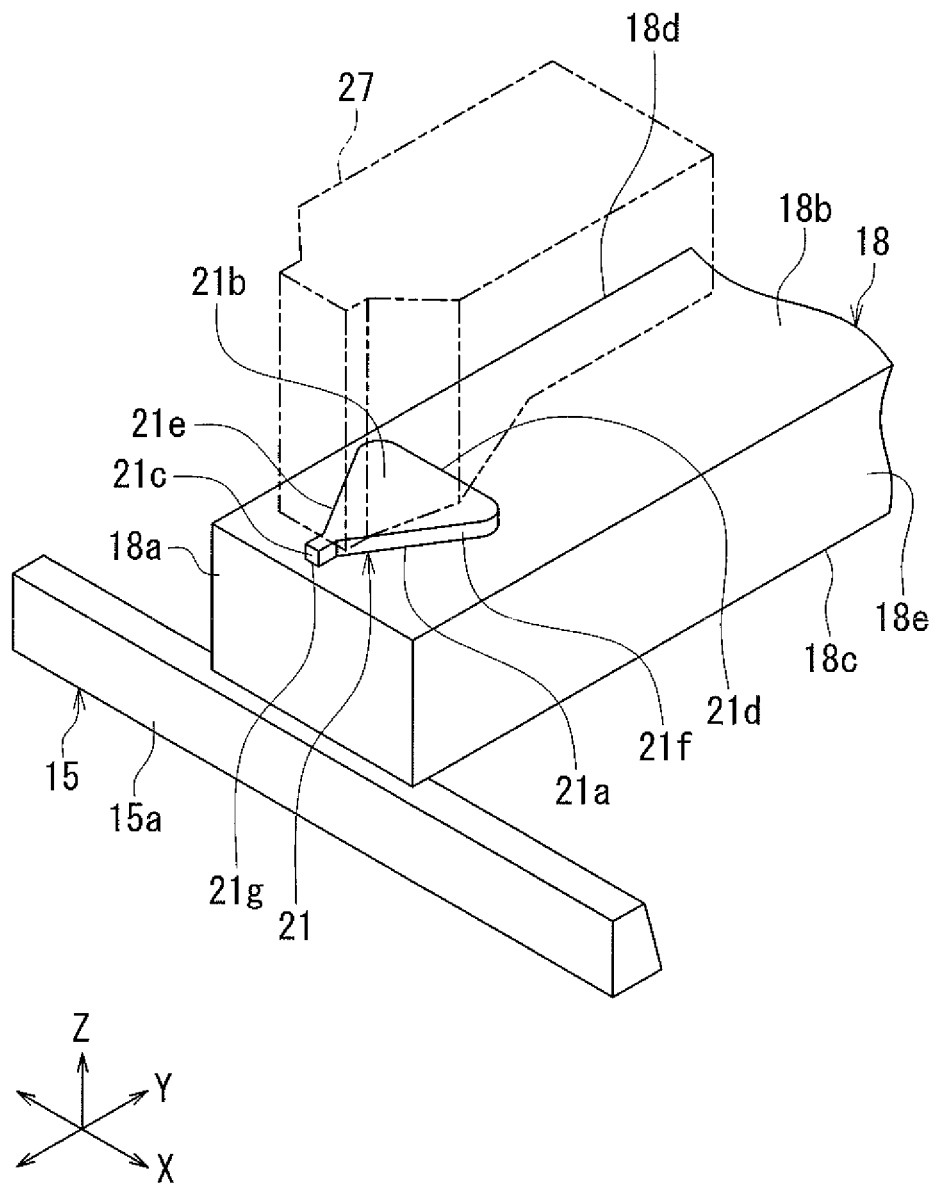
FIG. 2 is an enlarged perspective view of a part of FIG. 1.
Figure 3:
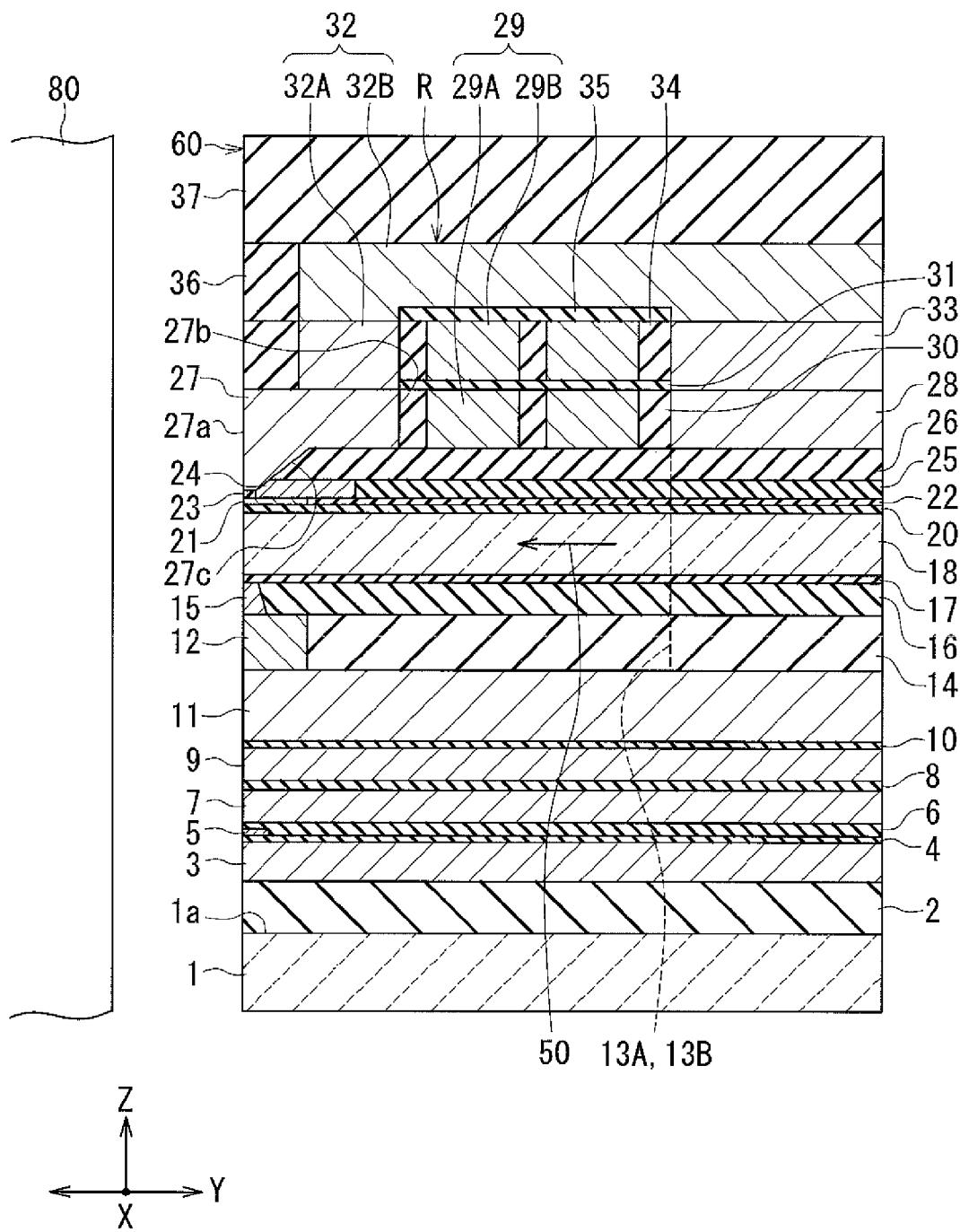
FIG. 3 is a cross-sectional view showing the configuration of the thermally-assisted magnetic recording head according to the first embodiment of the invention.
Figure 4:
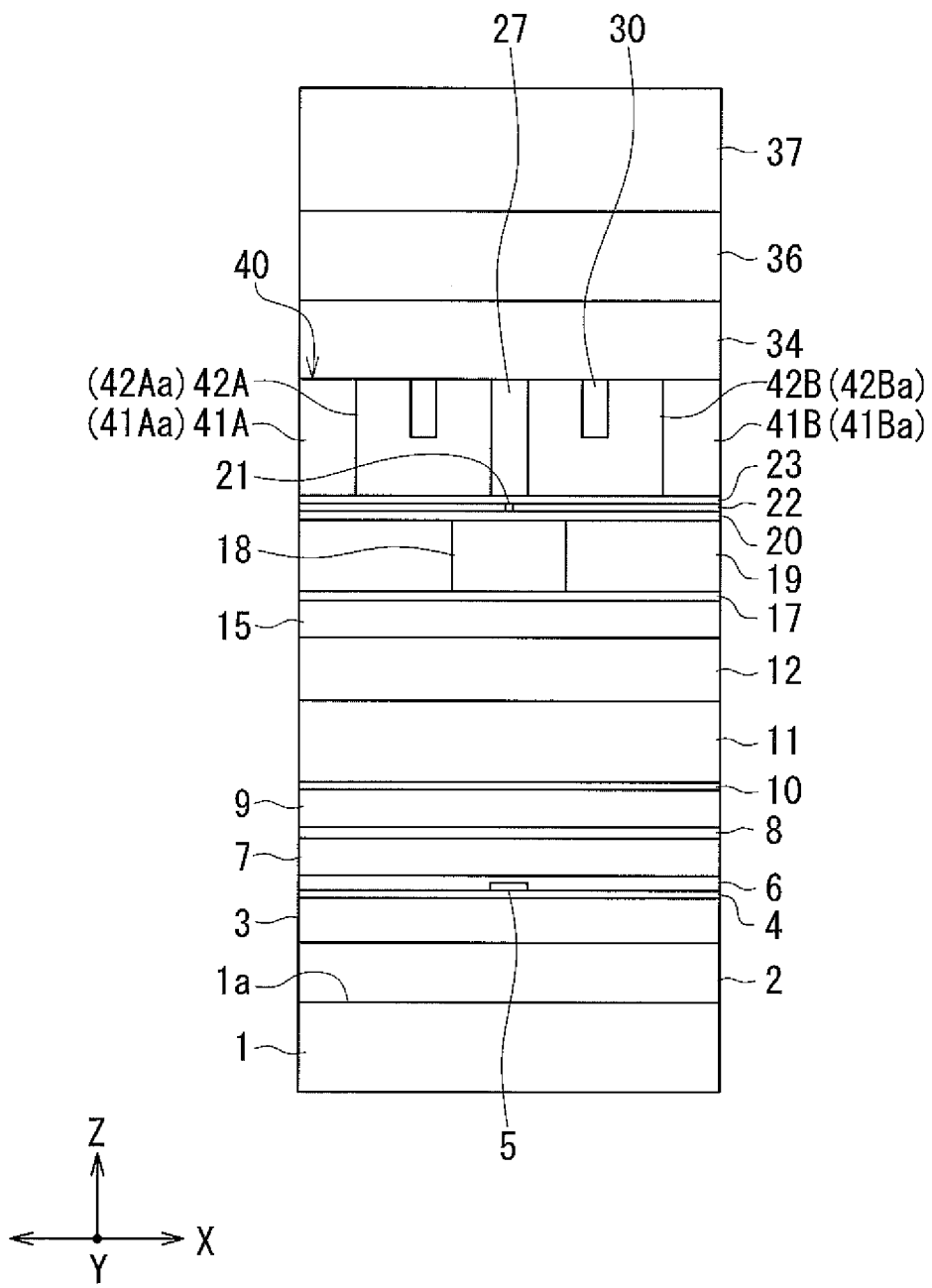
FIG. 4 is a front view showing the medium facing surface of the thermally-assisted magnetic recording head according to the first embodiment of the invention.
Figure 5:
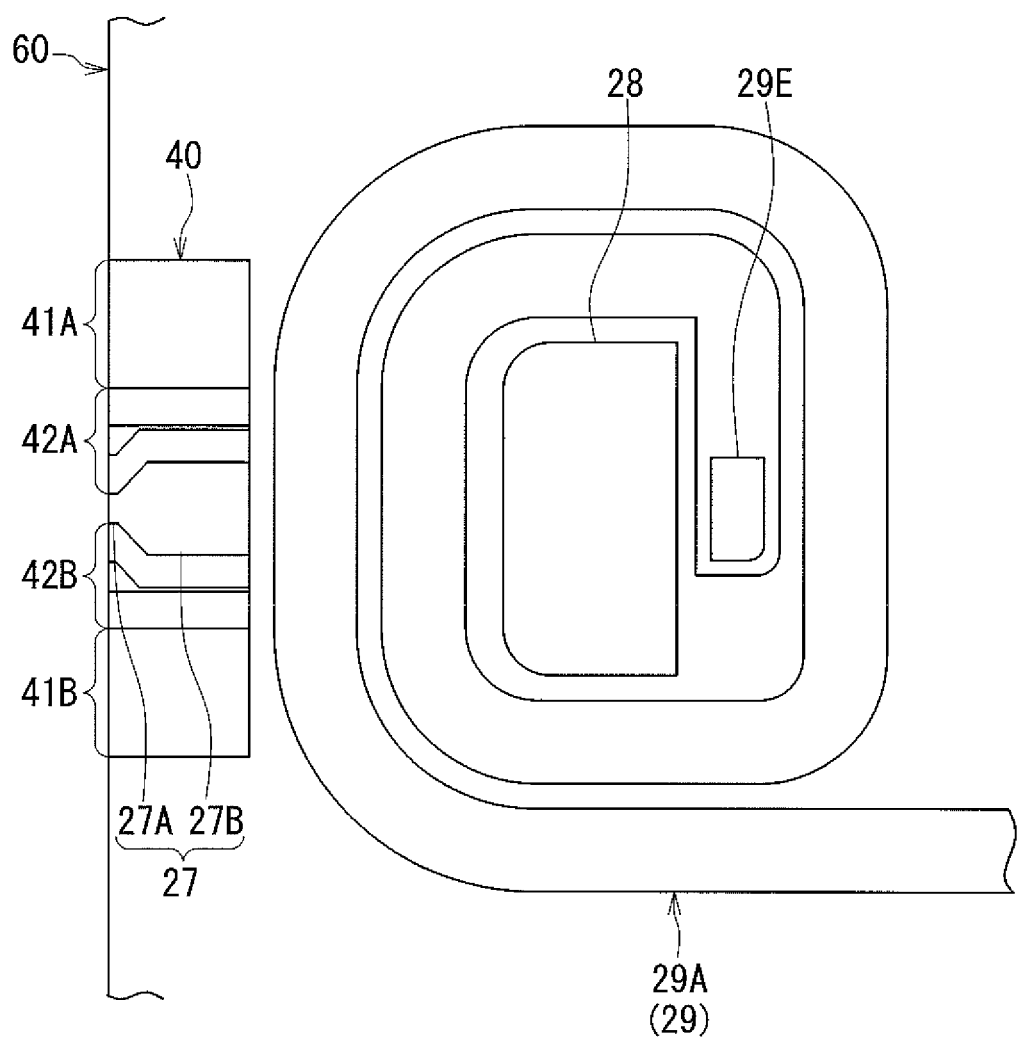
FIG. 5 is a plan view showing a first layer of a coil of the first embodiment of the invention.
Figure 6:
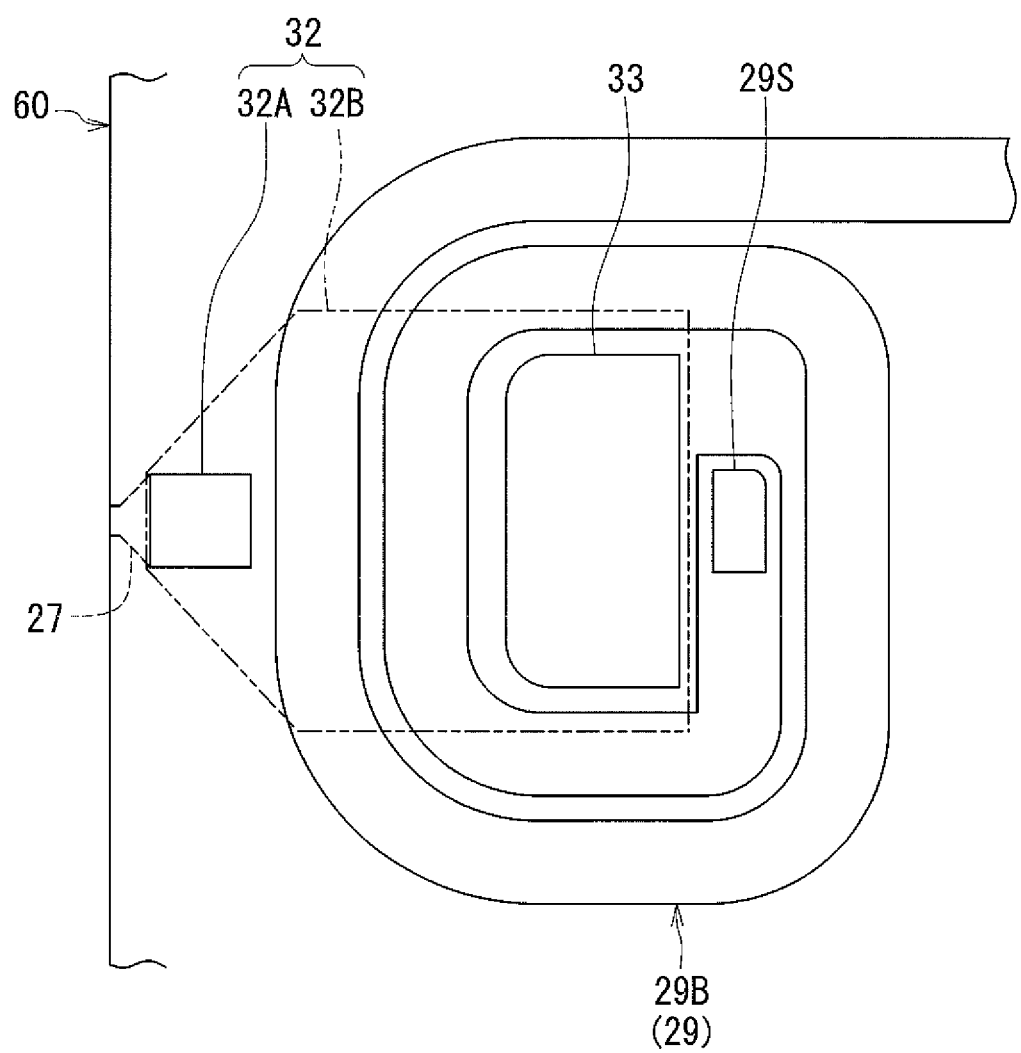
FIG. 6 is a plan view showing a second layer of the coil of the first embodiment of the invention.

Preferred embodiments of the present invention will now be described in detail with reference to the drawings. First, reference is made to FIG. 1 to FIG. 6 to describe the configuration of a thermally-assisted magnetic recording head according to a first embodiment of the invention. FIG. 1 is a perspective view showing the main part of the thermally-assisted magnetic recording head. FIG. 2 is an enlarged perspective view of a part of FIG. 1. FIG. 3 is a cross-sectional view showing the configuration of the thermally-assisted magnetic recording head. FIG. 4 is a front view showing the medium facing surface of the thermally-assisted magnetic recording head. FIG. 5 is a plan view showing a first layer of a coil of the present embodiment. FIG. 6 is a plan view showing a second layer of the coil of the present embodiment.

The thermally-assisted magnetic recording head according to the present embodiment is for use in perpendicular magnetic recording, and is in the form of a slider configured to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 3, the thermally-assisted magnetic recording head has a medium facing surface 60 facing a recording medium 80. Here, X direction, Y direction, and Z direction will be defined as follows. The X direction is the direction across the tracks of the recording medium 80, i.e., the track width direction. The Y direction is a direction perpendicular to the medium facing surface 60. The Z direction is the direction of travel of the recording medium 80 as viewed from the slider. The X, Y, and Z directions are orthogonal to one another.

As shown in FIG. 3 and FIG. 4, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 60. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head unit. The thermally-assisted magnetic recording head further includes an insulating layer 8 disposed on the top shield layer 7, a middle shield layer 9 formed of a magnetic material and disposed on the insulating layer 8, a nonmagnetic layer 10 formed of a nonmagnetic material and disposed on the middle shield layer 9, and a write head unit disposed on the nonmagnetic layer 10. The middle shield layer 9 has the function of shielding the MR element 5 from magnetic fields generated in the write head unit. The insulating layer 8 and the nonmagnetic layer 10 are formed of alumina, for example.

The write head unit includes a coil 29 and a main pole 27. The coil 29 is configured to produce a magnetic field corresponding to data to be written on the recording medium 80. As shown in FIG. 1 and FIG. 3, the main pole 27 has a first end face 27a located in the medium facing surface 60. The main pole 27 is configured to allow a magnetic flux corresponding to the magnetic field produced by the coil 29 to pass, and configured to produce a write magnetic field for writing data on the recording medium 80 by means of a perpendicular magnetic recording system. The coil 29 is formed of a conductive material such as copper.

The write head unit further includes a shield 15 formed of a magnetic material and a return path section R formed of a magnetic material. As shown in FIG. 1 and FIG. 2, the shield 15 has a second end face 15a located in the medium facing surface 60. The return path section R connects the main pole 27 and the shield 15 to each other, and allows a magnetic flux corresponding to the magnetic field produced by the coil 29 to pass.

The return path section R includes a return pole layer 11, coupling layers 12, 28 and 33, two coupling portions 13A and 13B, and a first yoke portion 32. The return pole layer 11 is disposed on the nonmagnetic layer 10. The return pole layer 11 has an end face located in the medium facing surface 60. The write head unit further includes a non-illustrated insulating layer disposed around the return pole layer 11. The non-illustrated insulating layer is formed of alumina, for example.

The coupling layer 12 is disposed on a first portion of the top surface of the return pole layer 11, the first portion being near the medium facing surface 60. The two coupling portions 13A and 13B are located on two second portions of the top surface of the return pole layer 11, the two second portions being located away from the medium facing surface 60. The coupling layer 12 has an end face located in the medium facing surface 60. Each of the coupling portions 13A and 13B includes a first layer lying on the return pole layer 11, and a second, a third and a fourth layer arranged in this order on the first layer. The first layer of the coupling portion 13A and the first layer of the coupling portion 13B are disposed to be adjacent in the track width direction (the X direction).

The write head unit further includes an insulating layer 14 lying on the non-illustrated insulating layer and a portion of the top surface of the return pole layer 11 other than the first and second portions. The first layers of the coupling portions 13A and 13B are embedded in the insulating layer 14. The insulating layer 14 is formed of alumina, for example.

The shield 15 is located near the medium facing surface 60 and lies on a portion of the top surface of the coupling layer 12 near the medium facing surface 60. The write head unit further includes an insulating layer 16 lying on the insulating layer 14 and the top surface of the coupling layer 12 excluding the aforementioned portion. The second layers of the coupling portions 13A and 13B are embedded in the insulating layer 16. The insulating layer 16 is formed of alumina, for example.

The write head unit further includes a waveguide, the waveguide including a core 18 through which light propagates, and a cladding provided around the core 18. As shown in FIG. 2 in particular, the core 18 has a front end face 18a facing toward the medium facing surface 60, an evanescent light generating surface 18b which is a top surface, a bottom surface 18c, and two side surfaces 18d and 18e. The front end face 18a may be located in the medium facing surface 60 or at a distance from the medium facing surface 60. FIG. 1 to FIG. 4 show an example in which the front end face 18a is located in the medium facing surface 60.

The cladding includes cladding layers 17, 19 and 20. The cladding layer 17 lies on the shield 15 and the insulating layer 16. The core 18 lies on the cladding layer 17. The cladding layer 19 lies on the cladding layer 17 and surrounds the core 18. The cladding layer 20 is disposed over the evanescent light generating surface 18b of the core 18 and the top surface of the cladding layer 19.

The core 18 is formed of a dielectric material that transmits laser light to be used for generating near-field light. The laser light emitted from a non-illustrated laser diode enters the core 18 and propagates through the core 18. The cladding layers 17, 19 and 20 are each formed of a dielectric material that has a refractive index lower than that of the core 18. For example, the core 18 may be formed of tantalum oxide such as $Ta_2O_5$ or silicon oxynitride (SiON), whereas the cladding layers 17, 19 and 20 may be formed of silicon dioxide ($SiO_2$) or alumina.

The third layers of the coupling portions 13A and 13B are embedded in the cladding layers 17 and 19. The third layer of the coupling portion 13A and the third layer of the coupling portion 13B are located on opposite sides of the core 18 in the track width direction (the X direction) and spaced from the core 18.

The write head unit further includes a plasmon generator 21 lying on the cladding layer 20 so as to be positioned above the evanescent light generating surface 18b of the core 18 in the vicinity of the medium facing surface 60, and a dielectric layer 22 lying on the cladding layer 20 and surrounding the plasmon generator 21. The plasmon generator 21 is configured to excite surface plasmons on the principle to be described later. The plasmon generator 21 is formed of, for example, one of Au, Ag, Al, Cu, Pd, Pt, Rh and Ir, or an alloy composed of two or more of these elements. The dielectric layer 22 is formed of the same material as the cladding layers 17, 19 and 20, for example. The shape of the plasmon generator 21 will be described in detail later.

The write head unit further includes an insulating layer 23 located near the medium facing surface 60 and lying on a portion of the plasmon generator 21 and a portion of the dielectric layer 22, and a nonmagnetic metal layer 24 lying on another portion of the plasmon generator 21 and another portion of the dielectric layer 22. The nonmagnetic metal layer 24 has an end face facing toward the medium facing surface 60. This end face of the nonmagnetic metal layer 24 is located at a distance from the medium facing surface 60. The nonmagnetic metal layer 24 functions as a heat sink for the plasmon generator 21. More specifically, the nonmagnetic metal layer 24 dissipates heat generated at the plasmon generator 21 outward from the plasmon generator 21. The nonmagnetic metal layer 24 is formed of Au, for example. The insulating layer 23 is formed of the same material as the cladding layers 17, 19 and 20, for example.

The write head unit further includes a dielectric layer 25 disposed around the insulating layer 23 and the nonmagnetic metal layer 24, and a dielectric layer 26 disposed on the nonmagnetic metal layer 24 and the dielectric layer 25. The dielectric layer 26 has an end face facing toward the medium facing surface 60. This end face of the dielectric layer 26 is located farther from the medium facing surface 60 than is the end face of the nonmagnetic metal layer 24. The dielectric layers 25 and 26 are formed of the same material as the cladding layers 17, 19 and 20, for example.

The main pole 27 is disposed on the insulating layer 23, the nonmagnetic metal layer 24 and the dielectric layer 26 such that the plasmon generator 21 is interposed between the main pole 27 and the core 18. The main pole 27 is formed of a magnetic metal. The shape of the main pole 27 will be described in detail later.

As shown in FIG. 1 and FIG. 4, the write head unit further includes a heat sink 40 for the main pole 27 disposed around the main pole 27 in the vicinity of the medium facing surface 60. The heat sink 40 lies on the insulating layer 23 and the dielectric layer 26. The heat sink 40 will be described in detail later.

The fourth layers of the coupling portions 13A and 13B are embedded in the cladding layer 20 and the dielectric layers 22, 25 and 26. The coupling layer 28 is disposed on the fourth layers of the coupling portions 13A and 13B and the dielectric layer 26.

The coil 29 includes a first layer 29A and a second layer 29B. The first layer 29A lies on the dielectric layer 26. As shown in FIG. 5, the first layer 29A is wound approximately two turns around the coupling layer 28. The write head unit further includes insulating layers 30 and 31. The insulating layer 30 is disposed in the space between adjacent turns of the first layer 29A, and around the main pole 27, the heat sink 40, the coupling layer 28 and the first layer 29A. The insulating layer 31 is disposed on the first layer 29A and the insulating layer 30. The insulating layers 30 and 31 are formed of alumina, for example.

The first yoke portion 32 includes a first layer 32A and a second layer 32B. The first layer 32A lies on the main pole 27. The first layer 32A has an end face facing toward the medium facing surface 60. This end face of the first layer 32A is located at a distance from the medium facing surface 60.

The coupling layer 33 lies on the coupling layer 28. The second layer 29B of the coil 29 lies on the insulating layer 31. As shown in FIG. 6, the second layer 29B is wound approximately two turns around the coupling layer 33. The write head unit further includes insulating layer 34 and 35. The insulating layer 34 is disposed in the space between adjacent turns of the second layer 29B, and around the first layer 32A of the first yoke portion 32, the coupling layer 33 and the second layer 29B. The insulating layer 35 lies on the second layer 29B and the insulating layer 34. The insulating layers 34 and 35 are formed of alumina, for example.

The second layer 32B of the first yoke portion 32 lies on the first layer 32A of the first yoke portion 32, the coupling layer 33 and the insulating layer 35. The second layer 32B has an end face facing toward the medium facing surface 60. This end face of the second layer 32B is located at a distance from the medium facing surface 60. The write head unit further includes an insulating layer 36 disposed around the second layer 32B. The insulating layer 36 is formed of alumina, for example.

The thermally-assisted magnetic recording head further includes a protective layer 37 disposed to cover the write head unit. The protective layer 37 is formed of alumina, for example.

As has been described, the thermally-assisted magnetic recording head according to the present embodiment includes the medium facing surface 60, the read head unit, and the write head unit. The read head unit and the write head unit are stacked on the substrate 1. The write head unit is located on the trailing side, i.e., the front side in the direction of travel of the recording medium 80 (the Z direction), relative to the read head unit.

The write head unit includes the coil 29, the main pole 27, the waveguide, the plasmon generator 21, the heat sink 40, the shield 15, and the return path section R. The waveguide includes the core 18 and the cladding. The cladding includes the cladding layers 17, 19 and 20. The return path section R includes the return pole layer 11, the coupling layers 12, 28 and 33, the two coupling portions 13A and 13B, and the first yoke portion 32.

The main pole 27 has the first end face 27a located in the medium facing surface 60. The shield 15 has the second end face 15a located in the medium facing surface 60. The first end face 27a and the second end face 15a are located at positions that are different from each other in the direction of travel of the recording medium 80 (the Z direction). In the present embodiment, in particular, the second end face 15a is located on the leading side, i.e., the rear side in the direction of travel of the recording medium 80 relative to the first end face 27a.

The main pole 27 is located on the front side in the direction of travel of the recording medium 80 relative to the core 18. The core 18 has the front end face 18a located in the medium facing surface 60. The front end face 18a is located between the first end face 27a and the second end face 15a in the direction of travel of the recording medium 80.

The shield 15 captures a disturbance magnetic field applied to the thermally-assisted magnetic recording head from the outside thereof. This makes it possible to prevent the disturbance magnetic field from being intensively captured into the main pole 27 and thereby causing erroneous writing on the recording medium 80. The shield 15 also has the function of capturing a magnetic flux that is produced from the first end face 27a of the main pole 27 and spreads in directions other than the direction perpendicular to the plane of the recording medium 80, and thereby preventing the magnetic flux from reaching the recording medium 80. It is thereby possible to increase the write field intensity gradient. The shield 15 and the return path section R also have the function of allowing a magnetic flux that has been produced from the first end face 27a of the main pole 27 and has magnetized the recording medium 80 to flow back to the main pole 27.

The shape and location of the coil 29 will now be described in detail with reference to FIG. 5 and FIG. 6. As shown in FIG. 5, the first layer 29A of the coil 29 is wound approximately two turns around the coupling layer 28. The first layer 29A includes a portion extending to pass between the main pole 27 and the coupling layer 28. The first layer 29A has a coil connection 29E electrically connected to the second layer 29B of the coil 29.

As shown in FIG. 6, the second layer 29B is wound approximately two turns around the coupling layer 33. The second layer 29B includes a portion extending to pass between the first layer 32A of the first yoke portion 32 and the coupling layer 33. The second layer 29B has a coil connection 29S electrically connected to the coil connection 29E of the first layer 29A. The coil connection 29S penetrates the insulating layer 31 (see FIG. 3) and is electrically connected to the coil connection 29E. In the example shown in FIG. 5 and FIG. 6, the first layer 29A and the second layer 29B are connected in series.

An example of the shape of the plasmon generator 21 will now be described with reference to FIG. 2. The plasmon generator 21 has a plasmon exciting part 21a serving as a bottom surface, and further has a top surface 21b, a front end face 21c located in the medium facing surface 60, a rear end face 21d opposite to the front end face 21c, and two side surfaces 21e and 21f. The plasmon exciting part 21a is located at a predetermined distance from the evanescent light generating surface 18b of the core 18 and faces the evanescent light generating surface 18b. The cladding layer 20 is interposed between the evanescent light generating surface 18b and the plasmon exciting part 21a. For example, the plasmon generator 21 is rectangular in cross section parallel to the medium facing surface 60.

The front end face 21c includes a near-field light generating part 21g located at the front extremity of the plasmon exciting part 21a. The first end face 27a of the main pole 27 and the near-field light generating part 21g are located at positions that are different from each other in the direction of travel of the recording medium 80. In the present embodiment, the first end face 27a is located on the front side in the direction of travel of the recording medium 80 relative to the near-field light generating part 21g. The near-field light generating part 21g is located between the first end face 27a and the second end face 15a of the shield 15. The near-field light generating part 21g is configured to generate near-field light on the principle to be described later.

As shown in FIG. 2, the plasmon generator 21 includes a narrow portion located in the vicinity of the medium facing surface 60, and a wide portion which is located farther from the medium facing surface 60 than is the narrow portion. The narrow portion has a front end face located in the medium facing surface 60. The front end face of the narrow portion also serves as the front end face 21c of the plasmon generator 21. The width of the narrow portion in the direction parallel to the medium facing surface 60 and to the top surface 1a of the substrate 1 (the X direction) may be constant regardless of distance from the medium facing surface 60 or may decrease with increasing proximity to the medium facing surface 60. The wide portion is located on a side of the narrow portion farther from the front end face 21c and is coupled to the narrow portion. The width of the wide portion is the same as that of the narrow portion at the boundary between the narrow portion and the wide portion, and increases with increasing distance from the narrow portion.

The width (the dimension in the track width direction (the X direction)) of the front end face 21c is defined by the width of the narrow portion in the medium facing surface 60. The width of the front end face 21c falls within the range of 5 to 40 nm, for example. The height (the dimension in the Z direction) of the front end face 21c is defined by the height of the narrow portion in the medium facing surface 60. The height of the front end face 21c falls within the range of 5 to 40 nm, for example.

An example of the shape of the main pole 27 will now be described with reference to FIG. 3 and FIG. 5. As shown in FIG. 3, the main pole 27 has the first end face 27a, and further has a rear end face 27b opposite to the first end face 27a, and a bottom surface 27c. The bottom surface 27c includes a first flat portion, an inclined portion and a second flat portion arranged in this order, the first flat portion being closest to the medium facing surface 60. The distance from the top surface 1a of the substrate 1 to an arbitrary point on the inclined portion increases with increasing distance from the arbitrary point to the medium facing surface 60. The first and second flat portions extend in a direction substantially perpendicular to the medium facing surface 60.

As shown in FIG. 5, the main pole 27 includes: a narrow portion 27A having the first end face 27a and an end opposite thereto; and a wide portion 27B connected to the end of the narrow portion 27A. The wide portion 27B is greater than the narrow portion 27A in width in the track width direction (the X direction). The width of the narrow portion 27A in the track width direction is generally constant regardless of distance from the medium facing surface 60. The width of the wide portion 27B in the track width direction is the same as that of the narrow portion 27A at the boundary between the narrow portion 27A and the wide portion 27B, and gradually increases with increasing distance from the medium facing surface 60, then becoming constant. The narrow portion 27A has a length in the range of, for example, 0 to 0.3 μm in the direction perpendicular to the medium facing surface 60. Where this length is 0, the narrow portion 27A is not present and thus the wide portion 27B has the first end face 27a.

The distance between the bottom surface 27c of the main pole 27 and the evanescent light generating surface 18b of the core 18 increases with increasing distance from the medium facing surface 60. This feature of the present embodiment makes it possible to prevent the light propagating through the core 18 from being absorbed in part by the main pole 27 and to prevent the surface plasmons excited on the plasmon exciting part 21a from being absorbed in part by the main pole 27.

The heat sink 40 will now be described in detail with reference to FIG. 1, FIG. 4 and FIG. 5. The heat sink 40 includes at least one first portion and at least one second portion, each of the at least one first portion and the at least one second portion having an end face located in the medium facing surface 60. The at least one first portion is located on an outward side of the main pole 27 in the track width direction (the X direction) and spaced from the main pole 27. At least part of the at least one second portion is located between the main pole 27 and the at least one first portion.

In the present embodiment, as shown in FIG. 1, FIG. 4 and FIG. 5, the at least one first portion of the heat sink 40 is two first portions 41A and 41B. The first portions 41A and 41B are located on opposite sides of the main pole 27 in the track width direction and are each spaced from the main pole 27. As shown in FIG. 4, the first portions 41A and 41B have their respective end faces 41Aa and 41Ba located in the medium facing surface 60. As shown in FIG. 5, the length of each of the first portions 41A and 41B in the direction perpendicular to the medium facing surface 60 is equal to the length of the main pole 27 in that direction.

In the present embodiment, as shown in FIG. 1, FIG. 4 and FIG. 5, the at least one second portion of the heat sink 40 is two second portions 42A and 42B. At least part of the second portion 42A is located between the main pole 27 and the first portion 41A, and at least part of the second portion 42B is located between the main pole 27 and the first portion 41B. In the present embodiment, in particular, the whole of the second portion 42A is located between the main pole 27 and the first portion 41A, and the whole of the second portion 42B is located between the main pole 27 and the first portion 41B. As shown in FIG. 4, the second portions 42A and 42B have their respective end faces 42Aa and 42Ba located in the medium facing surface 60.

As shown in FIG. 1 and FIG. 4, the second portion 42A is located in a first groove formed between the main pole 27 and the first portion 41A, and contacts the main pole 27 and the first portion 41A. In the present embodiment, the second portion 42A does not completely fill the first groove. The second portion 42B is located in a second groove formed between the main pole 27 and the first portion 41B, and contacts the main pole 27 and the first portion 41B. In the present embodiment, the second portion 42B does not completely fill the second groove. Further, in the present embodiment, the top surfaces of the main pole 27, the first portions 41A and 41B and the second portions 42A and 42B are coplanar.

The main pole 27 and the first portions 41A and 41B are each formed of a magnetic metal. The magnetic metal is preferably an alloy containing one or more elements selected from Fe, Co and Ni. Examples of such an alloy include NiFe, CoFe, and CoNiFe. The magnetic metal used to form the main pole 27 and the magnetic metal used to form the first portions 41A and 41B may be the same.

The second portions 42A and 42B are formed of a nonmagnetic metal. The nonmagnetic metal may be one of Au, Ag, Al, Cu, Mo, W, Ir, Ru, Rh, Cr, Pd, and Pt. Each of these metals has a thermal conductivity equal to or higher than that of Fe, a typical magnetic metal, thus being suitable for the material of the second portions 42A and 42B constituting part of the heat sink 40.

For example, the second portions 42A and 42B can be formed by forming a nonmagnetic metal film after the main pole 27 and the first portions 41A and 41B are formed, the nonmagnetic metal film having a thickness smaller than the depth of the first and second grooves and smaller than ½ the maximum width of the first and second grooves in the X direction. The two second portions 42A and 42B may completely fill the first and second grooves, respectively. The second portions 42A and 42B of such a form can be formed by forming a nonmagnetic metal film having a thickness of approximately ½ the maximum width of the first and second grooves in the X direction after the main pole 27 and the two first portions 41A and 41B are formed.

Now, the principle of generation of near-field light in the present embodiment and the principle of thermally-assisted magnetic recording using near-field light will be described in detail. Laser light emitted from a laser diode (not illustrated) enters the core 18. As shown in FIG. 3, the laser light 50 propagates through the core 18 toward the medium facing surface 60, and reaches the vicinity of the plasmon generator 21. The evanescent light generating surface 18b of the core 18 generates evanescent light based on the laser light 50 propagating through the core 18. More specifically, the laser light 50 is totally reflected at the evanescent light generating surface 18b, and the evanescent light generating surface 18b thereby generates evanescent light that permeates into the cladding layer 20. In the plasmon generator 21, surface plasmons are excited on the plasmon exciting part 21a through coupling with the aforementioned evanescent light. The surface plasmons propagate to the near-field light generating part 21g, and the near-field light generating part 21g generates near-field light based on the surface plasmons.

The near-field light generated from the near-field light generating part 21g is projected toward the recording medium 80, reaches the surface of the recording medium 80 and heats a part of the magnetic recording layer of the recording medium 80. This lowers the coercivity of the part of the magnetic recording layer. In thermally-assisted magnetic recording, the part of the magnetic recording layer with the lowered coercivity is subjected to a write magnetic field produced by the main pole 27 for data writing.

The specific functions and effects of the thermally-assisted magnetic recording head according to the present embodiment will now be described. In the present embodiment, the heat sink 40 is provided around the main pole 27. The present embodiment thus allows for suppressing a temperature rise of the main pole 27 caused by the heat generated by the plasmon generator 21, and consequently allows for preventing the main pole 27 from being corroded.

If a heat sink for the main pole 27 is formed only of a nonmagnetic metal, the heat sink, whose material is different from the material of the main pole 27, i.e., a magnetic metal, will extend broadly around the main pole 27. In such a case, large stress may be generated on the heat sink to cause the heat sink to peel away and/or cause damage to the plasmon generator 21 located near the heat sink.

In the present embodiment, in contrast, the heat sink 40 includes the two first portions 41A and 41B formed of a magnetic metal and the two second portions 42A and 42B formed of a nonmagnetic metal. The present embodiment thus allows for the use of a smaller amount of nonmagnetic metal to form the heat sink 40 than in the case of forming the heat sink from a nonmagnetic metal only. Consequently, the present embodiment makes it possible to prevent the heat sink 40 from peeling away and prevent the plasmon generator 21 near the heat sink 40 from being damaged.

The nonmagnetic metal used to form the second portions 42A and 42B is one having high thermal conductivity, in particular. Such a nonmagnetic metal can be used only for the heat sink 40 in the thermally-assisted magnetic recording head. Examples of nonmagnetic metals having high thermal conductivity include a noble metal such as Au or Ag. Forming the entire heat sink using such a nonmagnetic metal, particularly a noble metal, raises the cost of the thermally-assisted magnetic recording head.

On the other hand, magnetic metals are used for many parts of the thermally-assisted magnetic recording head, such as the main pole 27, the shield 15 and the return path section R. Thus, an increase in the amount of use of magnetic metals in the thermally-assisted magnetic recording head would hardly raise the cost.

In the present embodiment, as mentioned above, the heat sink 40 is constituted by the first portions 41A and 41B formed of a magnetic metal and the second portions 42A and 42B formed of a nonmagnetic metal. This allows for the use of a smaller amount of nonmagnetic metal to form the heat sink 40 than in the case of forming the heat sink from a nonmagnetic metal only. Consequently, the present embodiment makes it possible to avoid an increase in cost of the thermally-assisted magnetic recording head.

Further, if a heat sink is formed only of a nonmagnetic metal, the use of a smaller amount of nonmagnetic metal would decrease the volume of the heat sink and the area of its end face, thereby reducing the heat dissipation performance of the heat sink to cause a reduction in efficiency for cooling the main pole 27. In the present embodiment, in contrast, even if the second portions 42A and 42B formed of a nonmagnetic metal is small in volume and the end faces 42Aa and 42Ba are small in area, it is possible to provide a large total volume of the first portions 41A and 41B and the second portions 42A and 42B and a large total area of the end faces 41Aa and 41Ba of the first portions 41A and 41B and the end faces 42Aa and 42Ba of the second portions 42A and 42B. Consequently, the present embodiment makes it possible to improve the heat dissipation performance of the heat sink 40 as a whole to thereby improve the efficiency for cooling the main pole 27.

As has been described, according to the present embodiment, it is possible to prevent the problem that will result from forming the heat sink for the main pole 27 from a nonmagnetic metal only.

In the present embodiment, the second portions 42A and 42B do not completely fill the first and second grooves formed between the main pole 27 and the first portions 41A and 41B. This also allows for the use of a smaller amount of nonmagnetic metal to form the heat sink 40, and thereby allows for avoiding an increase in cost of the thermally-assisted magnetic recording head.

Second Embodiment

Figure 7:
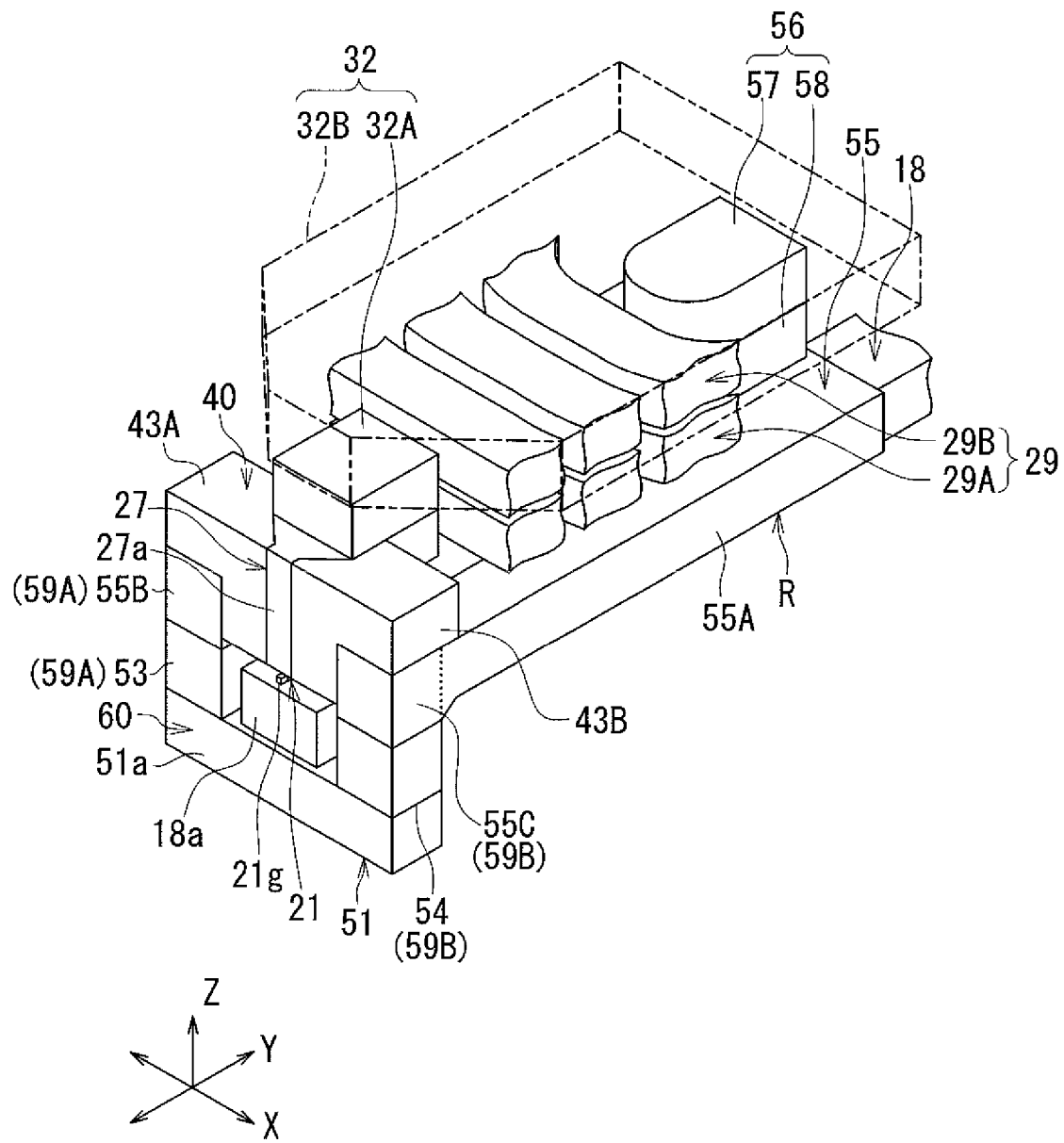
FIG. 7 is a perspective view showing the main part of a thermally-assisted magnetic recording head according to a second embodiment of the invention.
Figure 8:
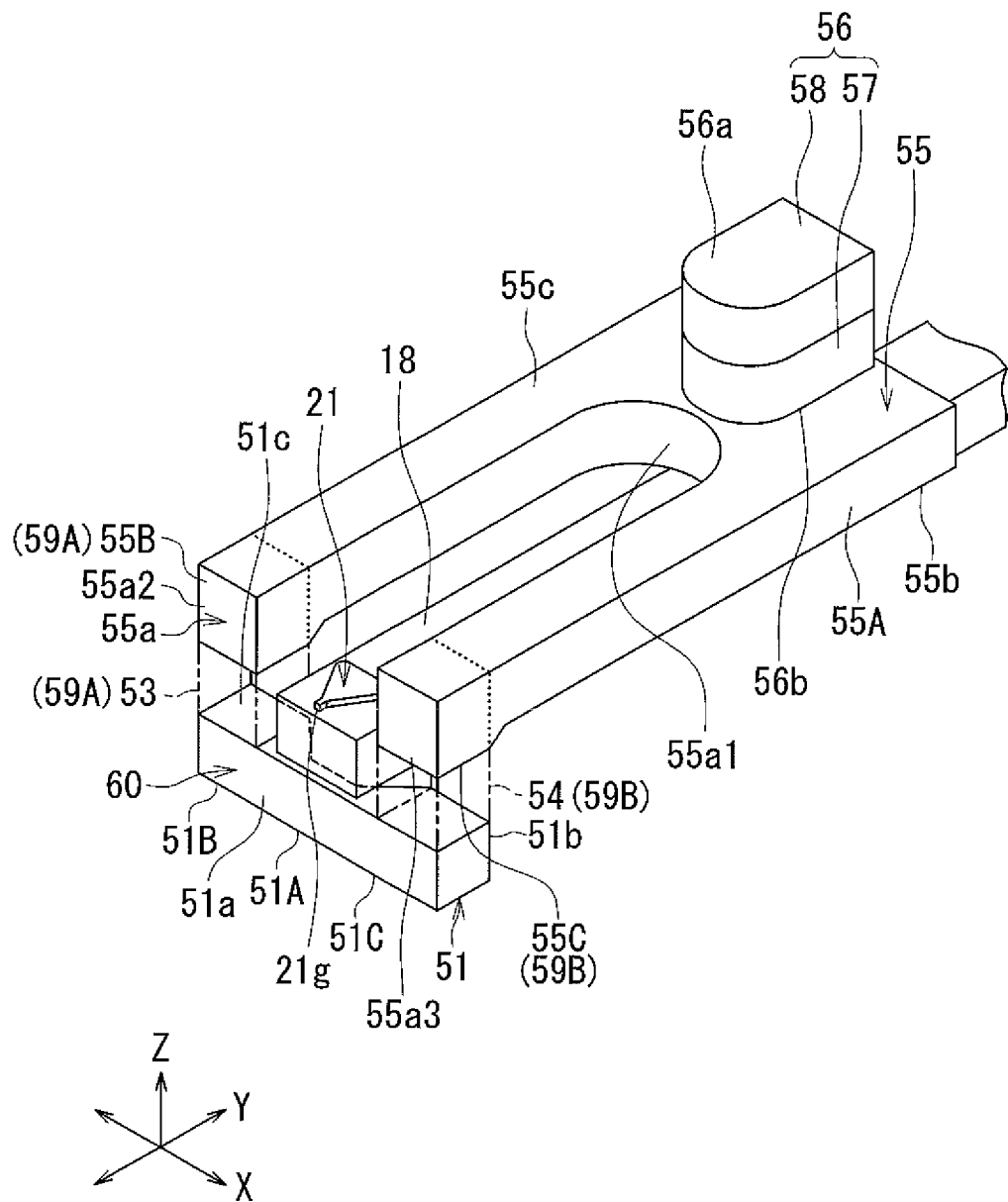
FIG. 8 is a perspective view showing a part of FIG. 7.
Figure 9:
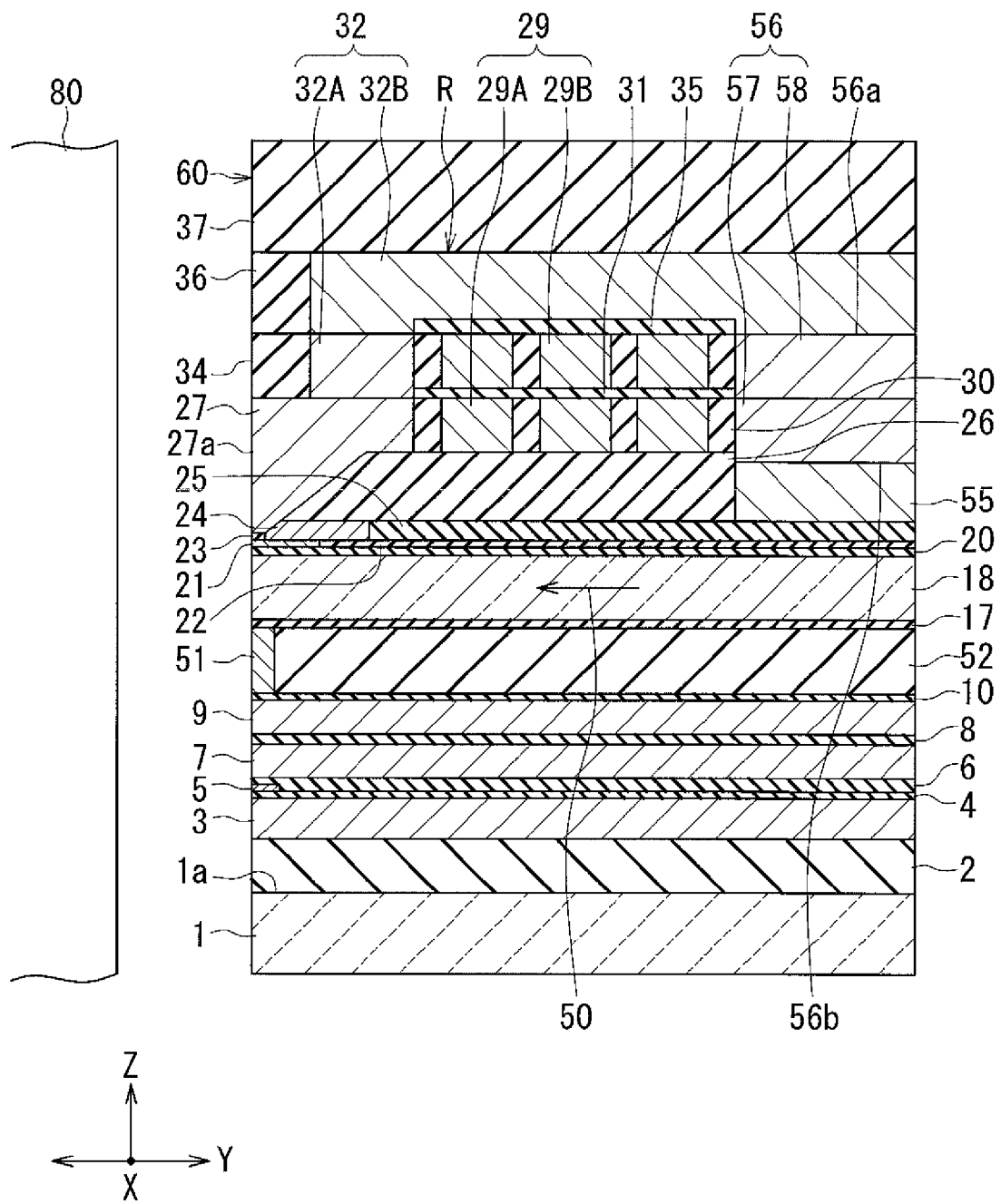
FIG. 9 is a cross-sectional view showing the configuration of the thermally-assisted magnetic recording head according to the second embodiment of the invention.
Figure 10:
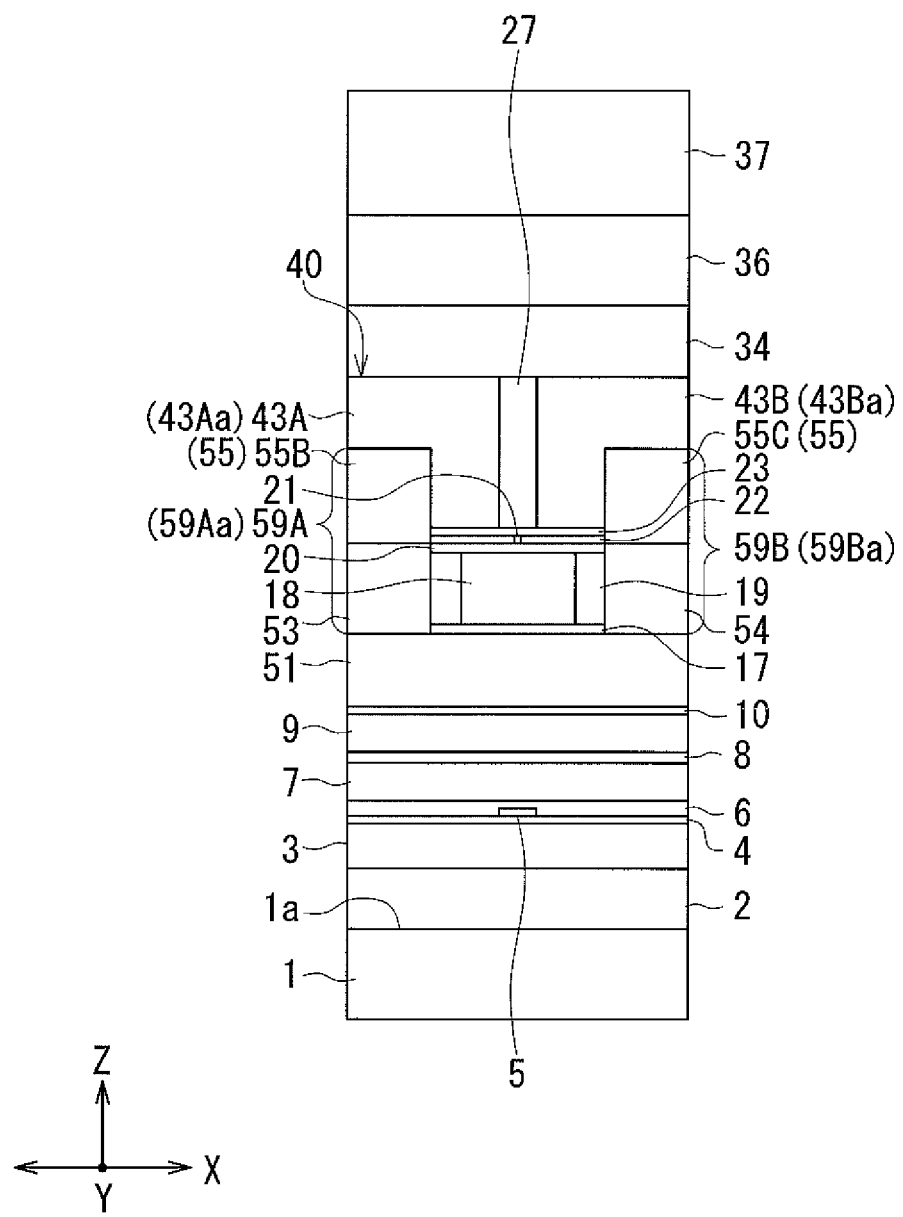
FIG. 10 is a front view showing the medium facing surface of the thermally-assisted magnetic recording head according to the second embodiment of the invention.
Figure 11:
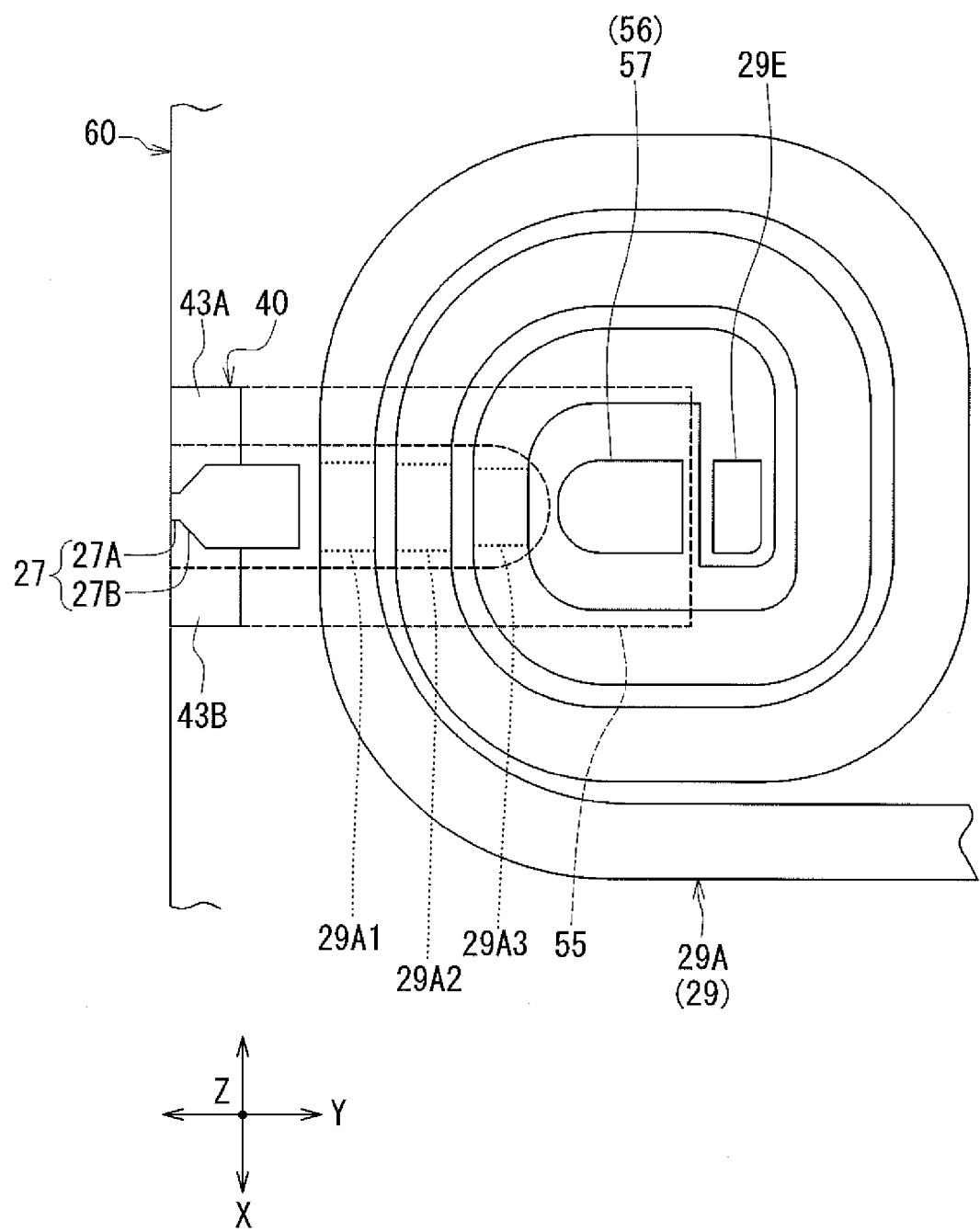
FIG. 11 is a plan view showing a first layer of the coil of the second embodiment of the invention.
Figure 12:
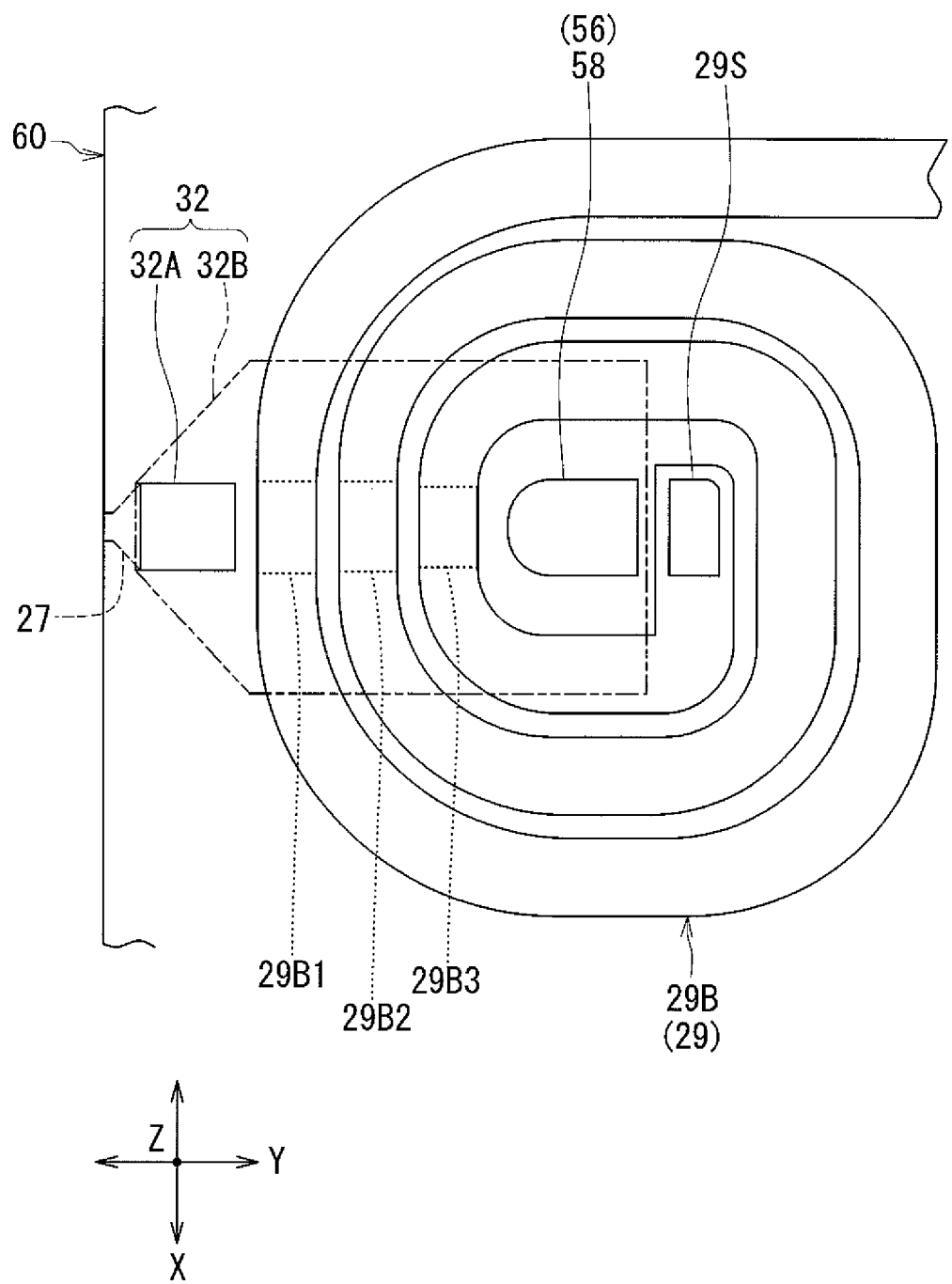
FIG. 12 is a plan view showing a second layer of the coil of the second embodiment of the invention.

A thermally-assisted magnetic recording head according to a second embodiment of the invention will now be described with reference to FIG. 7 to FIG. 12. FIG. 7 is a perspective view showing the main part of the thermally-assisted magnetic recording head. FIG. 8 is a perspective view showing a part of FIG. 7. FIG. 9 is a cross-sectional view showing the configuration of the thermally-assisted magnetic recording head. FIG. 10 is a front view showing the medium facing surface of the thermally-assisted magnetic recording head. FIG. 11 is a plan view showing a first layer of a coil of the present embodiment. FIG. 12 is a plan view showing a second layer of the coil of the present embodiment.

The configuration of the thermally-assisted magnetic recording head according to the present embodiment differs from the first embodiment in the following ways. The thermally-assisted magnetic recording head according to the present embodiment includes a shield 51 formed of a magnetic material, in place of the shield 15. Further, the components of the return path section R of the first embodiment other than the first yoke portion 32, that is, the return pole layer 11, the coupling layer 12, the coupling portions 13A and 13B, and the coupling layers 28 and 33, are eliminated from the present embodiment. Instead, the return path section R of the present embodiment includes a second yoke portion 55A, a first columnar portion 56, a second columnar portion 59A, and a third columnar portion 59B. Further, the present embodiment is not provided with the non-illustrated insulating layer around the return pole layer 11, the insulating layers 14 and 16, the two first portions 41A and 41B and the two second portions 42A and 42B.

The shield 51 lies on the nonmagnetic layer 10. As shown in FIG. 8, the shield 51 has a second end face 51a located in the medium facing surface 60, a rear end face 51b opposite to the second end face 51a, and a top surface 51c. The first end face 27a of the main pole 27 and the second end face 51a of the shield 51 are located at positions that are different from each other in the direction of travel of the recording medium 80. In the present embodiment, the second end face 51a of the shield 51 is located on the rear side in the direction of travel of the recording medium 80 relative to the first end face 27a of the main pole 27.

The shield 51 includes a central portion 51A, and further includes a first side portion 51B and a second side portion 51C located on opposite sides of the central portion 51A in the track width direction (the X direction). The length of the central portion 51A in the direction perpendicular to the medium facing surface 60 is constant regardless of position in the track width direction. The maximum length of each of the side portions 51B and 51C in the direction perpendicular to the medium facing surface 60 is greater than the length of the central portion 51A in that direction.

The thermally-assisted magnetic recording head according to the present embodiment includes an insulating layer 52 lying on the nonmagnetic layer 10 and surrounding the shield 51. The insulating layer 52 is formed of alumina, for example.

The thermally-assisted magnetic recording head according to the present embodiment further includes a magnetic layer 55. The magnetic layer 55 is embedded in the dielectric layers 22, 25 and 26 and the insulating layer 23. The magnetic layer 55 is spaced a predetermined distance apart from the plasmon generator 21, the nonmagnetic metal layer 24 and the main pole 27. The magnetic layer 55 is formed of a magnetic metal. The magnetic metal is preferably an alloy containing one or more elements selected from Fe, Co and Ni.

As shown in FIG. 8, the magnetic layer 55 has a front end face 55a facing toward the medium facing surface 60, a bottom surface 55b, and a top surface 55c. The front end face 55a of the magnetic layer 55 includes a first portion 55a1, a second portion 55a2 and a third portion 55a3, the second and third portions 55a2 and 55a3 being located on opposite sides of the first portion 55a1 in the track width direction. The first portion 55a1 is shaped to be recessed such that the track-widthwise center of the first portion 55a1 is farthest from the medium facing surface 60. The first portion 55a1 is disposed to surround the plasmon generator 21, the nonmagnetic metal layer 24 and a portion of the main pole 27. The second and third portions 55a2 and 55a3 are located in the medium facing surface 60 at positions on opposite sides of the near-field light generating part 21g of the plasmon generator 21 in the track width direction.

The bottom surface 55b of the magnetic layer 55 includes a first flat portion, an inclined portion and a second flat portion arranged in this order, the first flat portion being closest to the medium facing surface 60. The distance from the top surface 1a of the substrate 1 to an arbitrary point on the inclined portion increases with increasing distance from the arbitrary point to the medium facing surface 60. The first and second flat portions extend in a direction substantially perpendicular to the medium facing surface 60. The second flat portion lies on the top surface of the dielectric layer 25. The top surface 55c of the magnetic layer 55 is located on the rear side in the direction of travel of the recording medium 80 relative to the top surface of the main pole 27.

The magnetic layer 55 includes the second yoke portion 55A as its main portion. The magnetic layer 55 further includes two coupling portions 55B and 55C located in the vicinity of the medium facing surface 60 at positions on opposite sides of the plasmon generator 21 in the track width direction and coupled to the second yoke portion 55A. In FIG. 7 and FIG. 8, the boundaries between the second yoke portion 55A and the coupling portions 55B and 55C are indicated in dotted lines. The coupling portion 55B includes the second portion 55a2 of the front end face 55a. The coupling portion 55C includes the third portion 55a3 of the front end face 55a.

The thermally-assisted magnetic recording head according to the present embodiment further includes two magnetic layers 53 and 54 located in the vicinity of the medium facing surface 60 at positions on opposite sides of the core 18 in the track width direction. The magnetic layers 53 and 54 penetrate the cladding layers 17, 19 and 20, and connect the shield 51 and the magnetic layer 55 to each other. Each of the magnetic layers 53 and 54 is formed of a magnetic metal. The magnetic metal is preferably an alloy containing one or more elements selected from Fe, Co and Ni.

Each of the magnetic layers 53 and 54 has a front end face located in the medium facing surface 60, a top surface, and a bottom surface. The bottom surface of the magnetic layer 53 is in contact with a portion of the top surface 51c of the shield 51 that is included in the first side portion 51B. The bottom surface of the magnetic layer 54 is in contact with a portion of the top surface 51c of the shield 51 that is included in the second side portion 51C. The top surface of the magnetic layer 53 is in contact with a portion of the bottom surface 55b of the magnetic layer 55 that is included in the coupling portion 55B. The top surface of the magnetic layer 54 is in contact with a portion of the bottom surface 55b of the magnetic layer 55 that is included in the coupling portion 55C.

The second columnar portion 59A is constituted by the magnetic layer 53 and the coupling portion 55B of the magnetic layer 55. The third columnar portion 59B is constituted by the magnetic layer 54 and the coupling portion 55C of the magnetic layer 55. As shown in FIG. 7, FIG. 8 and FIG. 10, the second columnar portion 59A and the third columnar portion 59B are located on opposite sides of the plasmon generator 21 and the main pole 27 in the track width direction and spaced from the plasmon generator 21 and the main pole 27.

As described above, since each of the magnetic layers 53 to 55 is formed of magnetic metal, each of the second and third columnar portions 59A and 59B is also formed of magnetic metal. In the present embodiment, the second and third columnar portions 59A and 59B constitute two first portions of the heat sink 40, taking the place of the two first portions 41A and 41B of the first embodiment. As shown in FIG. 10, the second and third columnar portions 59A and 59B have their respective end faces 59Aa and 59Ba located in the medium facing surface 60. The magnetic metal used to form the main pole 27 and the magnetic metal used to form the second and third columnar portions 59A and 59B (the magnetic metal used to form the magnetic layers 53 to 53) may be the same.

The heat sink 40 of the present embodiment includes two second portions 43A and 43B in place of the two second portions 42A and 42B of the first embodiment. At least part of the second portion 43A is located between the main pole 27 and the second columnar portion 59A, and at least part of the second portion 43B is located between the main pole 27 and the third columnar portion 59B. As shown in FIG. 10, the second portions 43A and 43B have their respective end faces 43Aa and 43Ba located in the medium facing surface 60. The second portions 43A and 43B are formed of the same material as the second portions 42A and 42B of the first embodiment.

As shown in FIG. 7 and FIG. 10, a part of the second portion 43A is located in a first groove formed between the main pole 27 and the second columnar portion 59A, and contacts the main pole 27 and the second columnar portion 59A. This part of the second portion 43A completely fills the first groove. Another part of the second portion 43A rides over the top surface of the second columnar portion 59A (the top surface 55c of the magnetic layer 55). A part of the second portion 43B is located in a second groove formed between the main pole 27 and the third columnar portion 59B, and contacts the main pole 27 and the third columnar portion 59B. This part of the second portion 43B completely fills the second groove. Another part of the second portion 43B rides over the top surface of the third columnar portion 59B (the top surface 55c of the magnetic layer 55).

The first columnar portion 56 has a first end 56a and a second end 56b opposite to each other in the direction of travel of the recording medium 80. In the present embodiment, the first end 56a lies at the front-side end of the first columnar portion 56 in the direction of travel of the recording medium 80, i.e., the trailing-side end of the first columnar portion 56, whereas the second end 56b lies at the rear-side end of the first columnar portion 56 in the direction of travel of the recording medium 80, i.e., the leading-side end of the first columnar portion 56.

The first columnar portion 56 includes a first layer 57 and a second layer 58. The first layer 57 includes the second end 56b and lies on a portion of the top surface 55c of the magnetic layer 55 at a position farther from the medium facing surface 60 than the main pole 27. The second layer 58 includes the first end 56a and lies on the first layer 57. The first layer 57 is embedded in the dielectric layer 26 and the insulating layer 30. The second layer 58 is embedded in the insulating layers 31 and 34.

The top surface of the main pole 27 and the top surface of the first layer 57 of the first columnar portion 56 are coplanar. The top surface of the first layer 32A of the first yoke portion 32 and the top surface of the second layer 58 of the first columnar portion 56 are coplanar.

In the present embodiment, the first layer 29A of the coil 29 is wound approximately three turns around the first layer 57 of the first columnar portion 56. The second layer 29B of the coil 29 is wound approximately three turns around the second layer 58 of the first columnar portion 56. The second layer 32B of the first yoke portion 32 lies on the first layer 32A of the first yoke portion 32, the second layer 58 of the first columnar portion 56 and the insulating layer 35.

As has been described, the return path section R of the present embodiment includes the first yoke portion 32, the second yoke portion 55A, the first columnar portion 56, the second columnar portion 59A, and the third columnar portion 59B. As shown in FIG. 8 and FIG. 9, the first yoke portion 32, the second yoke portion 55A and the first columnar portion 56 are located on the same side in the direction of travel of the recording medium 80 relative to the core 18. In the present embodiment, the first yoke portion 32, the second yoke portion 55A and the first columnar portion 56 are located on the trailing side, i.e., the front side in the direction of travel of the recording medium 80, relative to the core 18. The first columnar portion 56 is located away from the medium facing surface 60 and has the first end 56a and the second end 56b. As shown in FIG. 7 and FIG. 8, the second and third columnar portions 59A and 59B are located closer to the medium facing surface 60 than is the first columnar portion 56.

The first yoke portion 32 connects the main pole 27 to the first end 56a of the first columnar portion 56. The second columnar portion 59A and the third columnar portion 59B are located on opposite sides of the plasmon generator 21 in the track width direction and connected to the shield 51. The second yoke portion 55A is connected to the second end 56b of the first columnar portion 56, and connected to the shield 51 via the second and third columnar portions 59A and 59B.

The shield 51 has the same functions as those of the shield 15 described in the first embodiment section. Specifically, the shield 51 has the functions of capturing a disturbance magnetic field applied to the thermally-assisted magnetic recording head from the outside thereof; capturing a magnetic flux that is produced from the first end face 27a of the main pole 27 and spreads in directions other than the direction perpendicular to the plane of the recording medium 80, and thereby preventing the magnetic flux from reaching the recording medium 80; and allowing a magnetic flux that has been produced from the first end face 27a of the main pole 27 and has magnetized a portion of the recording medium 80 to flow back to the main pole 27.

The shape and location of the coil 29 of the present embodiment will now be described in detail with reference to FIG. 11 and FIG. 12. As shown in FIG. 11, the first layer 29A of the coil 29 is wound approximately three turns around the first layer 57 of the first columnar portion 56. The first layer 29A includes the coil connection 29E described in the first embodiment section, and further includes three conductor portions (hereinafter referred to as linear conductor portions) 29A1, 29A2 and 29A3 interposed between the first layer 57 of the first columnar portion 56 and the medium facing surface 60 and extending linearly in parallel to the medium facing surface 60. The linear conductor portions 29A1, 29A2 and 29A3 are arranged in this order along the direction perpendicular to the medium facing surface 60, the linear conductor portion 29A1 being closest to the medium facing surface 60. Each of the linear conductor portions 29A1 to 29A3 has a constant width in the direction perpendicular to the medium facing surface 60 (the Y direction). In FIG. 11, the positions of opposite ends of each of the linear conductor portions 29A1 to 29A3 in the track width direction (the X direction) are indicated in dotted lines. This also applies to other drawings that show other linear conductor portions.

As shown in FIG. 12, the second layer 29B of the coil 29 is wound approximately three turns around the second layer 58 of the first columnar portion 56. The second layer 29B includes the coil connection 29S described in the first embodiment section, and further includes three linear conductor portions 29B1, 29B2 and 29B3 interposed between the second layer 58 of the first columnar portion 56 and the medium facing surface 60. Each of the linear conductor portions 29B1 to 29B3 has a constant width in the direction perpendicular to the medium facing surface 60 (the Y direction).

The specific functions and effects of the thermally-assisted magnetic recording head according to the present embodiment will now be described. In the present embodiment, the near-field light generating part 21g of the plasmon generator 21 is located between the first end face 27a of the main pole 27 and the second end face 51a of the shield 51. Part of the core 18 is located in the vicinity of the plasmon generator 21. The core 18 and the return path section R are configured to intersect each other without contacting each other. More specifically, the second and third columnar portions 59A and 59B of the return path section R are located on opposite sides of the core 18 in the track width direction without contacting the core 18.

In the present embodiment, the first yoke portion 32, the second yoke portion 55A and the first columnar portion 56 are located on the same side in the direction of travel of the recording medium 80 relative to the core 18, and the coil 29 is wound around the first columnar portion 56. The present embodiment allows the first columnar portion 56 to be small in width in the track width direction regardless of the distance between the respective outer ends of the second and third columnar portions 59A and 59B in the track width direction. The present embodiment thus allows the coil 29 to be small in entire length.

In order to improve the write characteristics in a high frequency band, it is desirable that the magnetic path formed by the main pole 27 and the return path section R be reduced in length. To achieve this, it is effective to bring the first columnar portion 56 into close proximity to the medium facing surface 60. In the present embodiment, the coil 29 is wound around the first columnar portion 56 which is small in width in the track width direction. Accordingly, even if the first columnar portion 56 is brought into close proximity to the medium facing surface 60, it is possible to avoid an increase in length of each of the linear conductor portions 29A1 to 29A3 of the first layer 29A of the coil 29 located between the first layer 57 of the first columnar portion 56 and the medium facing surface 60 and an increase in length of each of the linear conductor portions 29B1 to 29B3 of the second layer 29B of the coil 29 located between the second layer 58 of the first columnar portion 56 and the medium facing surface 60. The present embodiment thus allows the first columnar portion 56 to be located close to the medium facing surface 60 without causing a significant increase in resistance of the coil 29. Consequently, the present embodiment makes it possible to reduce the entire length of the coil 29 while reducing the length of the magnetic path. The present embodiment is thus able to provide a thermally-assisted magnetic recording head that exhibits excellent write characteristics in a high frequency band and has the coil 29 of low resistance.

Further, the present embodiment allows the coil 29 to have a low heating value because of its low resistance. This makes it possible to prevent the occurrence of a problem that the components around the coil 29 may expand to cause part of the medium facing surface 60 to protrude toward the recording medium 80 and thus become more likely to collide with the recording medium 80. Further, the present embodiment allows for a reduction in the distance between the medium facing surface 60 and the recording medium 80 for improvements in write characteristics such as the overwrite property.

The remainder of configuration, function and effects of the present embodiment are similar to those of the first embodiment.

Third Embodiment

Figure 13:
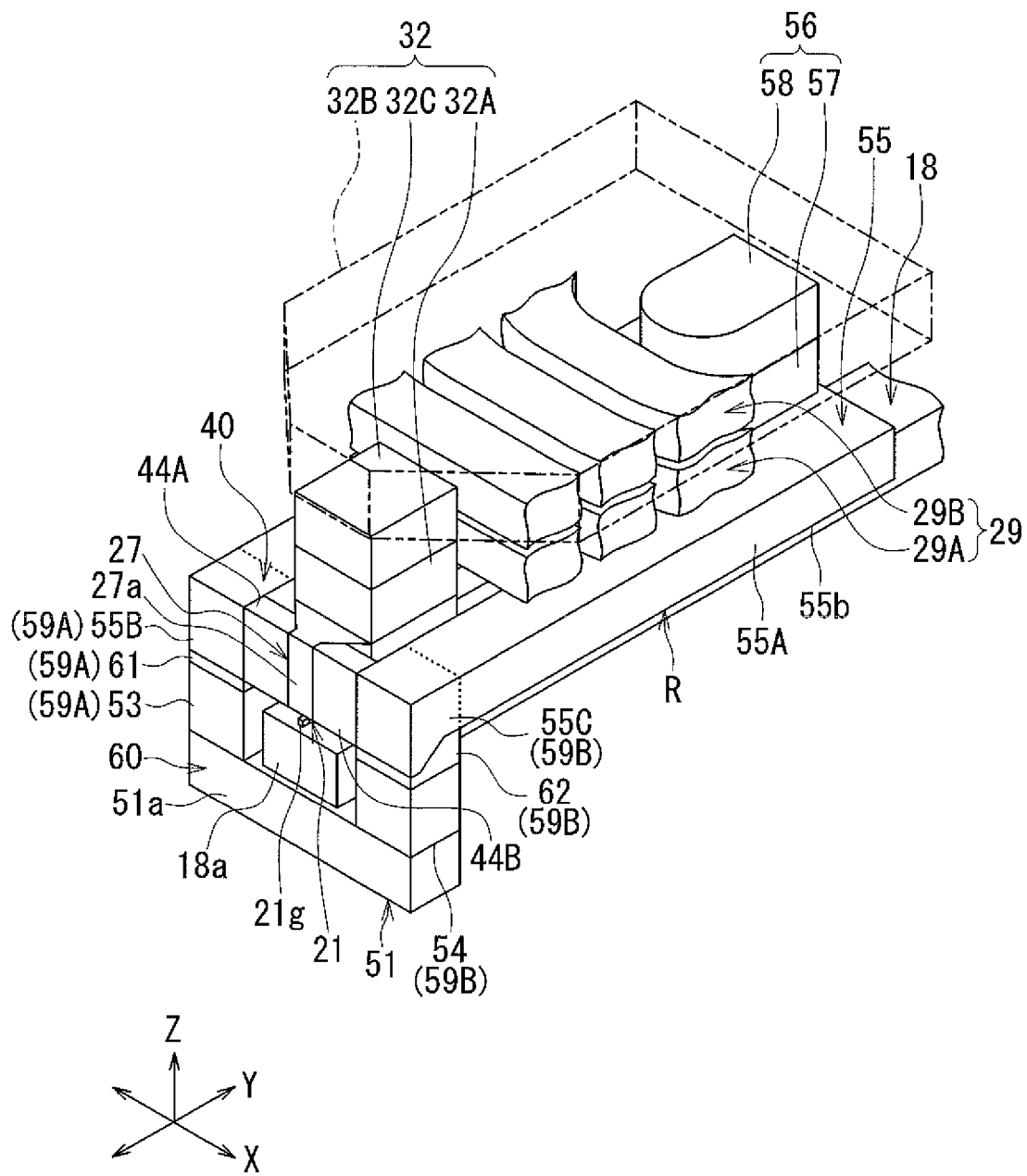
FIG. 13 is a perspective view showing the main part of a thermally-assisted magnetic recording head according to a third embodiment of the invention.
Figure 14:
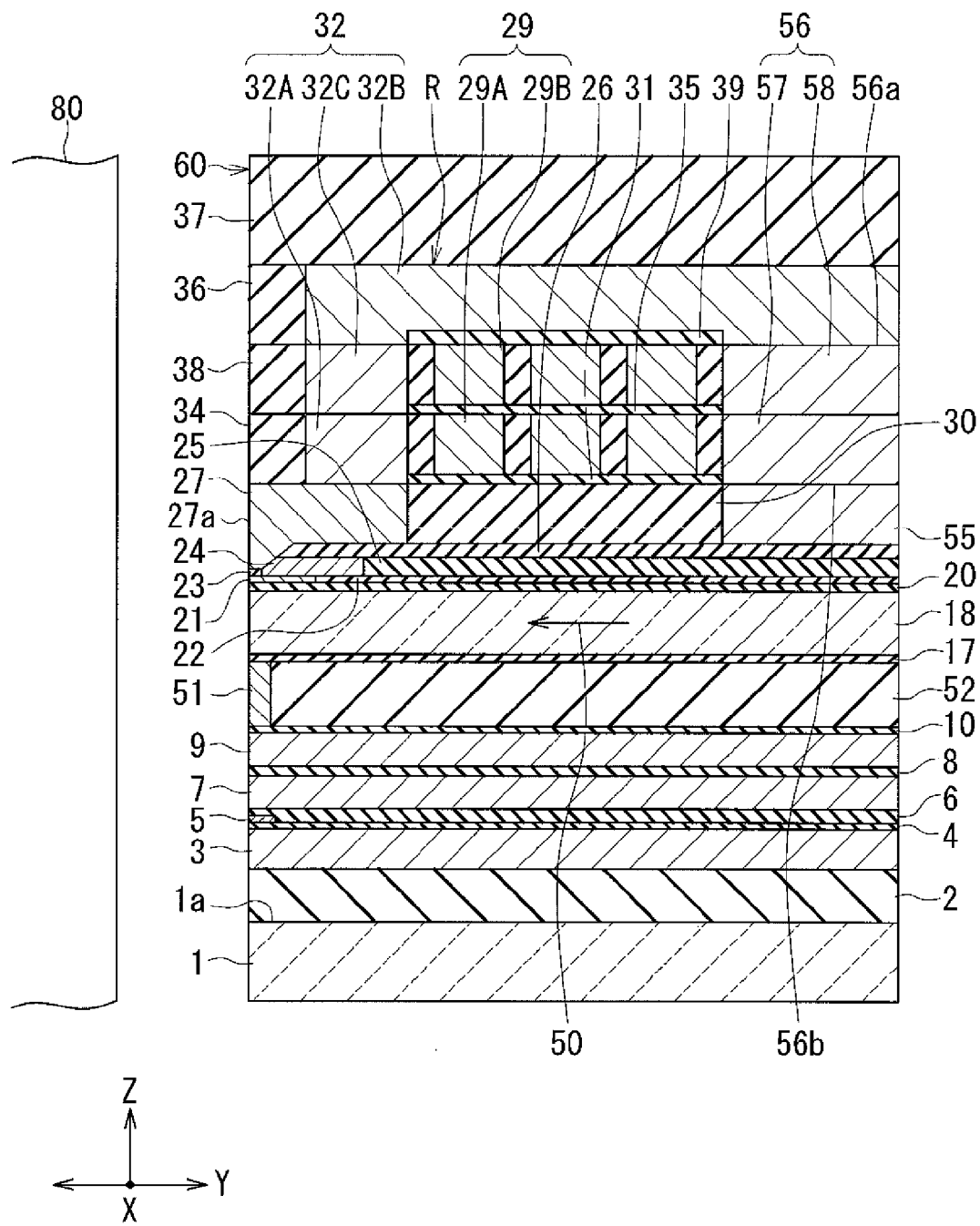
FIG. 14 is a cross-sectional view showing the configuration of the thermally-assisted magnetic recording head according to the third embodiment of the invention.
Figure 15:
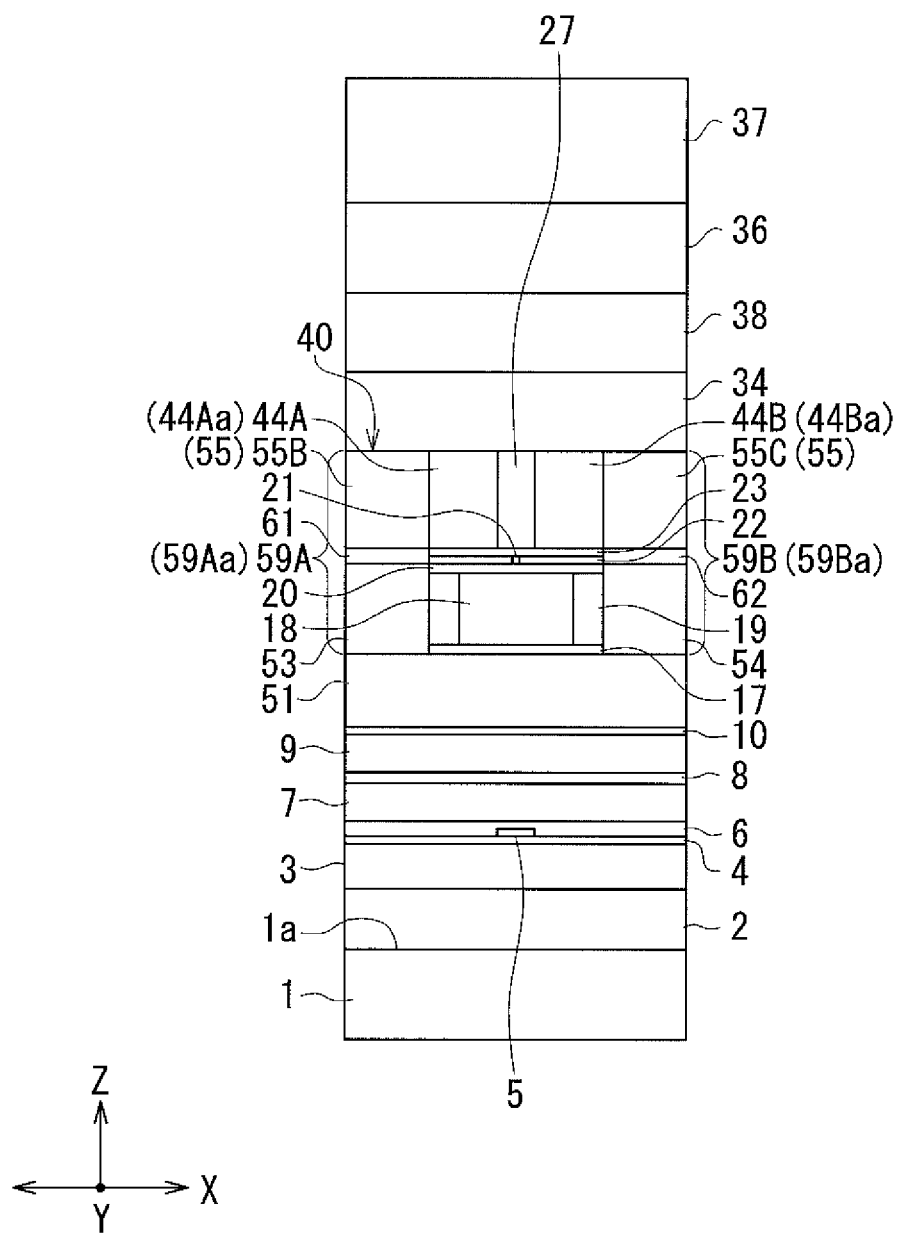
FIG. 15 is a front view showing the medium facing surface of the thermally-assisted magnetic recording head according to the third embodiment of the invention.

A thermally-assisted magnetic recording head according to a third embodiment of the invention will now be described with reference to FIG. 13 to FIG. 15. FIG. 13 is a perspective view showing the main part of the thermally-assisted magnetic recording head. FIG. 14 is a cross-sectional view showing the configuration of the thermally-assisted magnetic recording head. FIG. 15 is a front view showing the medium facing surface of the thermally-assisted magnetic recording head.

The configuration of the thermally-assisted magnetic recording head according to the present embodiment differs from the second embodiment in the following ways. In the thermally-assisted magnetic recording head according to the present embodiment, the magnetic layer 55 is embedded in the insulating layer 30. The second flat portion of the bottom surface 55b of the magnetic layer 55 lies on the top surface of the dielectric layer 26. The top surface of the main pole 27 and the top surface 55c of the magnetic layer 55 are coplanar.

The thermally-assisted magnetic recording head according to the present embodiment includes two magnetic layers 61 and 62 located in the vicinity of the medium facing surface 60 at positions on opposite sides of the plasmon generator 21 in the track width direction. The magnetic layer 61 penetrates the dielectric layers 22, 25 and 26 and the insulating layer 23, and connects the magnetic layers 53 and 55 to each other. The magnetic layer 62 penetrates the dielectric layers 22, 25 and 26 and the insulating layer 23, and connects the magnetic layers 54 and 55 to each other. Each of the magnetic layers 61 and 62 is formed of a magnetic metal. The magnetic metal is preferably an alloy containing one or more elements selected from Fe, Co and Ni.

Each of the magnetic layers 61 and 62 has a front end face located in the medium facing surface 60, a top surface, and a bottom surface. The bottom surface of the magnetic layer 61 is in contact with the top surface of the magnetic layer 53. The bottom surface of the magnetic layer 62 is in contact with the top surface of the magnetic layer 54. The top surface of the magnetic layer 61 is in contact with a portion of the bottom surface 55b of the magnetic layer 55 that is included in the coupling portion 55B. The top surface of the magnetic layer 62 is in contact with a portion of the bottom surface 55b of the magnetic layer 55 that is included in the coupling portion 55C.

In the present embodiment, the second columnar portion 59A is constituted by the magnetic layers 53 and 61 and the coupling portion 55B of the magnetic layer 55. The third columnar portion 59B is constituted by the magnetic layers 54 and 62 and the coupling portion 55C of the magnetic layer 55.

The heat sink 40 of the present embodiment includes two second portions 44A and 44B in place of the two second portions 43A and 43B of the second embodiment. At least part of the second portion 44A is located between the main pole 27 and the second columnar portion 59A, and at least part of the second portion 44B is located between the main pole 27 and the third columnar portion 59B. In the present embodiment, in particular, the whole of the second portion 44A is located between the main pole 27 and the second columnar portion 59A, and the whole of the second portion 44B is located between the main pole 27 and the third columnar portion 59B. As shown in FIG. 15, the second portions 44A and 44B have their respective end faces 44Aa and 44Ba located in the medium facing surface 60. The second portions 44A and 44B are formed of the same material as the second portions 43A and 43B of the second embodiment.

As shown in FIG. 13 and FIG. 15, the second portion 44A is located in a first groove formed between the main pole 27 and the second columnar portion 59A, and contacts the main pole 27 and the second columnar portion 59A. In the present embodiment, the second portion 44A fills a portion of the first groove near the medium facing surface 60, and does not completely fill the first groove. The second portion 44B is located in a second groove formed between the main pole 27 and the third columnar portion 59B, and contacts the main pole 27 and the third columnar portion 59B. In the present embodiment, the second portion 44B fills a portion of the second groove near the medium facing surface 60, and does not completely fill the second groove. Alternatively, the two second portions 44A and 44B may completely fill the first and second grooves, respectively.

In the present embodiment, the top surfaces of the first layer 32A of the first yoke portion 32 and the first layer 57 of the first columnar portion 56 are coplanar. The first layer 29A of the coil 29 lies on the insulating layer 31, and is wound approximately three turns around the first layer 57 of the first columnar portion 56. The insulating layer 34 is disposed in the space between adjacent turns of the first layer 29A of the coil 29, and around the first layer 32A of the first yoke portion 32, the first layer 57 of the first columnar portion 56 and the first layer 29A of the coil 29. The insulating layer 35 lies on the first layer 29A of the coil 29 and the insulating layer 34.

In the present embodiment, the first yoke portion 32 includes a third layer 32C in addition to the first layer 32A and the second layer 32B. The third layer 32C lies on the first layer 32A. The third layer 32C has an end face facing toward the medium facing surface 60. This end face of the third layer 32C is located at a distance from the medium facing surface 60. The top surface of the third layer 32C and the top surface of the second layer 58 of the first columnar portion 56 are coplanar. The second layer 29B of the coil 29 lies on the insulating layer 35, and is wound approximately three turns around the second layer 58 of the first columnar portion 56.

The thermally-assisted magnetic recording head according to the present embodiment further includes insulating layers 38 and 39. The insulating layer 38 is disposed in the space between adjacent turns of the second layer 29B of the coil 29, and around the third layer 32C of the first yoke portion 32, the second layer 58 of the first columnar portion 56 and the second layer 29B of the coil 29. The insulating layer 39 lies on the second layer 29B of the coil 29 and the insulating layer 30. The insulating layers 38 and 39 are formed of alumina, for example. In the present embodiment, the second layer 32B of the first yoke portion 32 lies on the third layer 32C of the first yoke portion 32, the second layer 58 of the first columnar portion 56 and the insulating layer 39.

The remainder of configuration, function and effects of the present embodiment are similar to those of the second embodiment.

Fourth Embodiment

Figure 16:
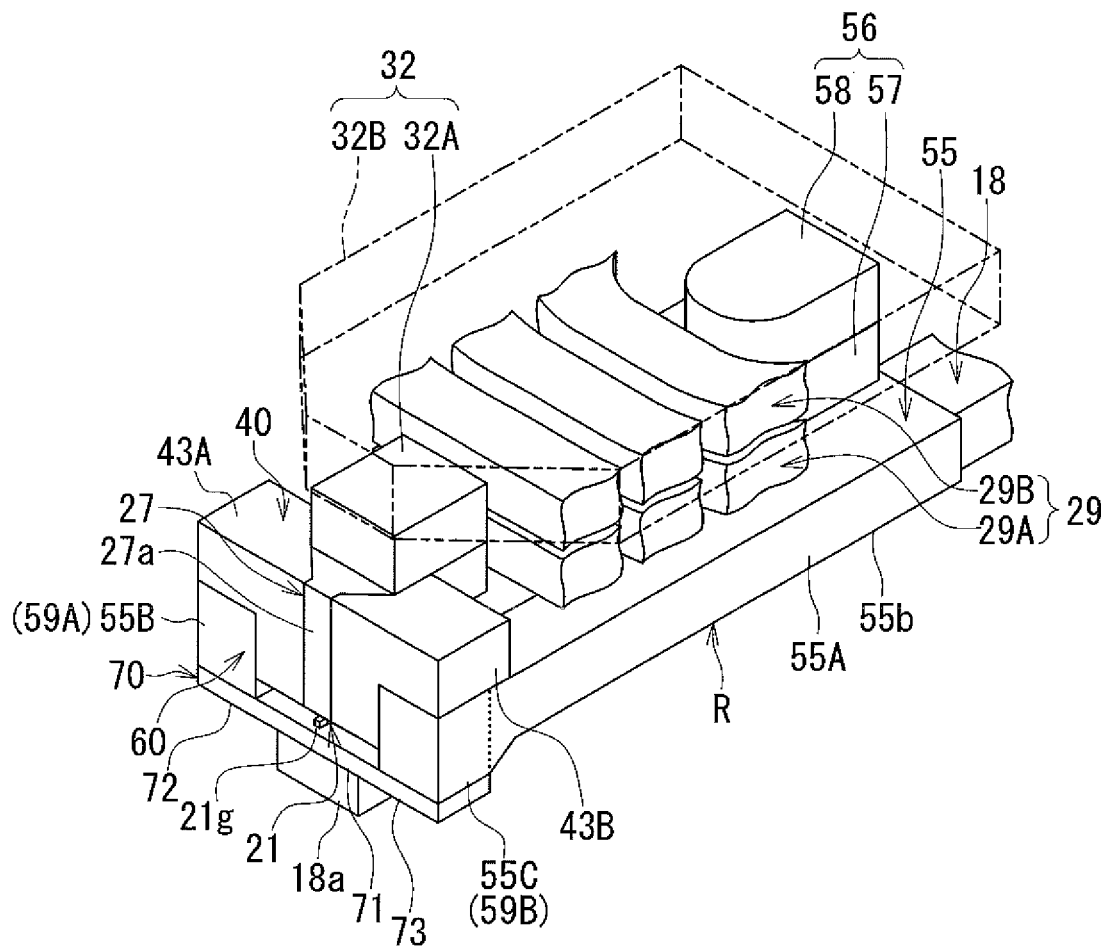
FIG. 16 is a perspective view showing the main part of a thermally-assisted magnetic recording head according to a fourth embodiment of the invention.
Figure 17:
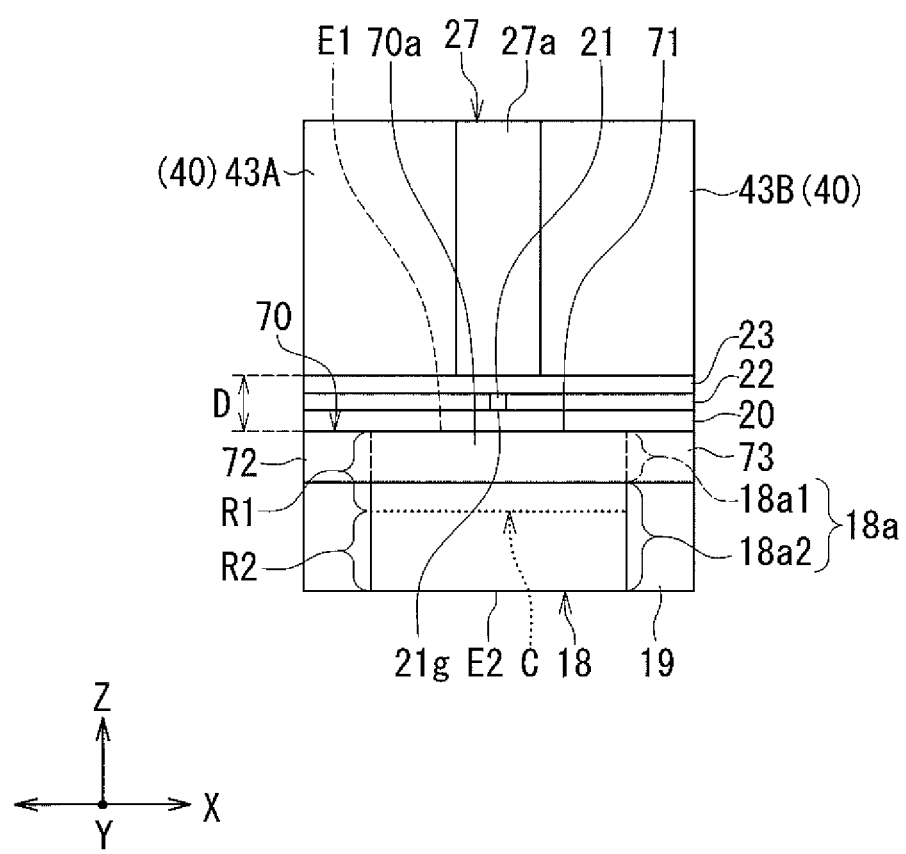
FIG. 17 is a front view showing the main part of the thermally-assisted magnetic recording head according to the fourth embodiment of the invention.
Figure 18:
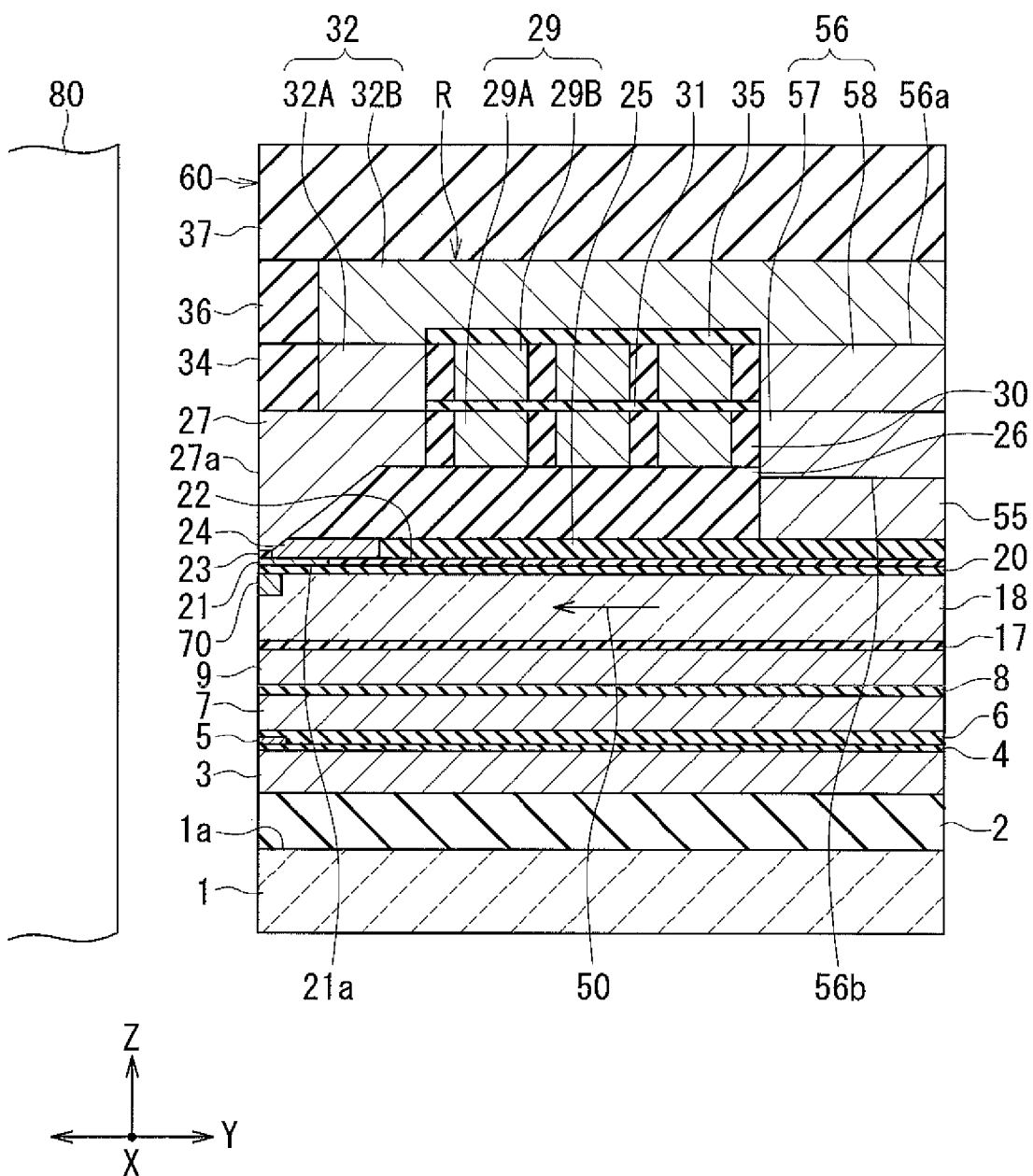
FIG. 18 is a cross-sectional view showing the configuration of the thermally-assisted magnetic recording head according to the fourth embodiment of the invention.
Figure 19:
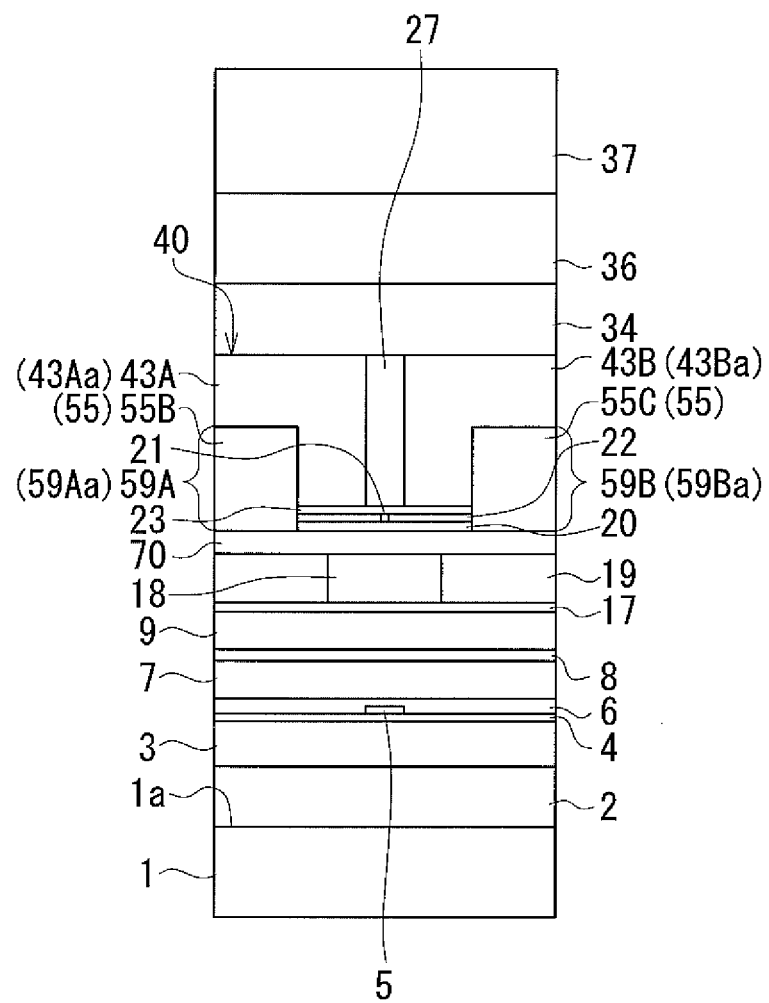
FIG. 19 is a front view showing the medium facing surface of the thermally-assisted magnetic recording head according to the fourth embodiment of the invention.
Figure 19:
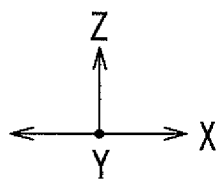
Figure 20:
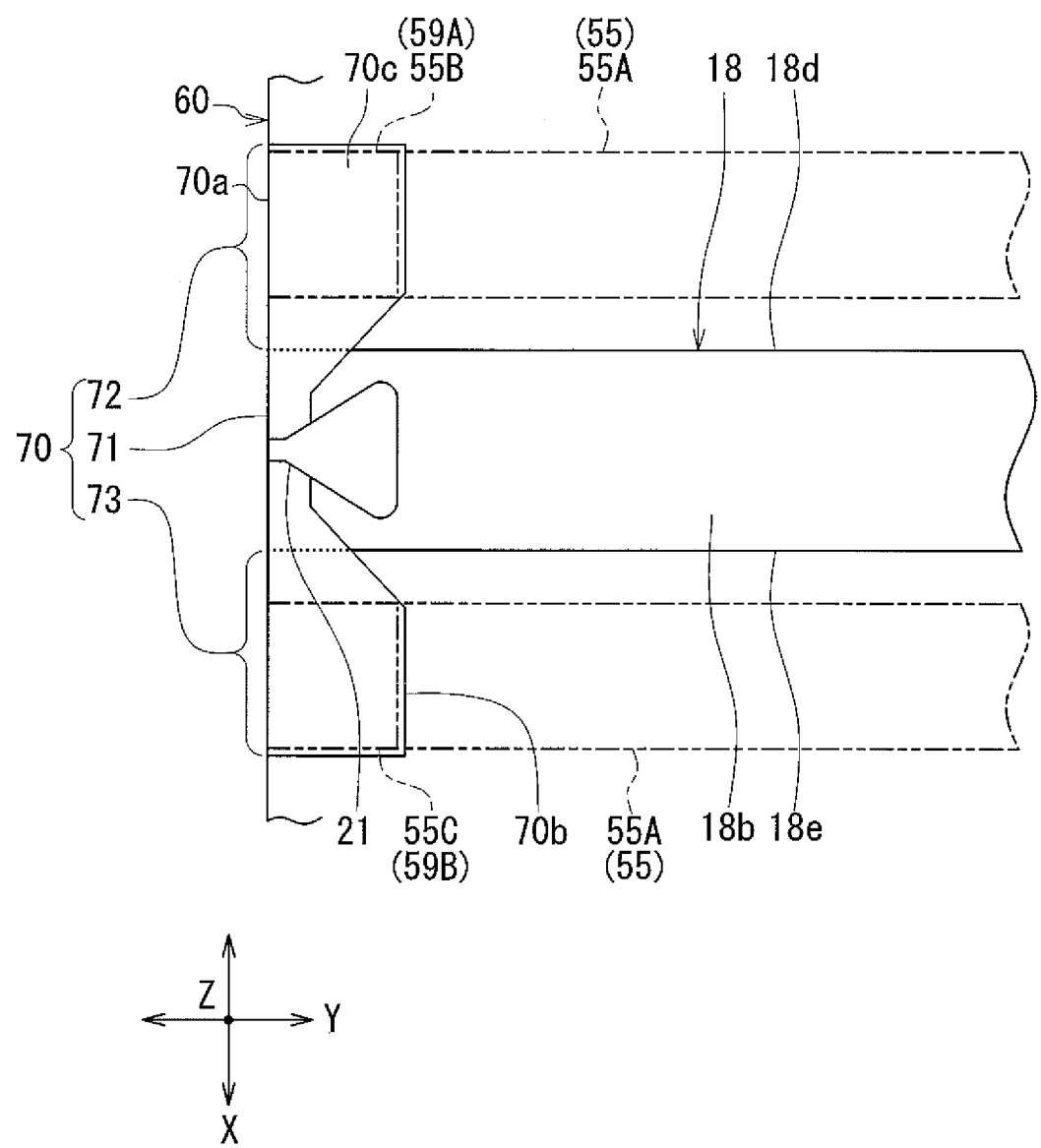
FIG. 20 is a plan view showing a part of the thermally-assisted magnetic recording head according to the fourth embodiment of the invention.

A thermally-assisted magnetic recording head according to a fourth embodiment of the invention will now be described with reference to FIG. 16 to FIG. 20. FIG. 16 is a perspective view showing the main part of the thermally-assisted magnetic recording head. FIG. 17 is a front view showing the main part of the thermally-assisted magnetic recording head. FIG. 18 is a cross-sectional view showing the configuration of the thermally-assisted magnetic recording head. FIG. 19 is a front view showing the medium facing surface of the thermally-assisted magnetic recording head. FIG. 20 is a plan view showing a part of the thermally-assisted magnetic recording head.

In the thermally-assisted magnetic recording head according to the present embodiment, portions located on the rear side in the direction of travel of the recording medium 80 relative to the plasmon generator 21 are configured in a different manner than in the second embodiment. The thermally-assisted magnetic recording head according to the present embodiment includes a shield 70 in place of the shield 51. The shield 70 is located near the front end face 18a of the core 18. The shield 70 is formed of a magnetic metal.

The shapes and locations of the shield 70 and the core 18 will now be described in detail with reference to FIG. 16, FIG. 17 and FIG. 20. The shield 70 has a second end face 70a located in the medium facing surface 60, a rear end face 70b opposite to the second end face 70a, a top surface 70c, and a bottom surface. The shield 70 is shaped to be greater in dimension in the track width direction (the X direction) than in dimension in the direction perpendicular to the top surface 1a of the substrate 1 (the Z direction).

The first end face 27a of the main pole 27 and the second end face 70a of the shield 70 are located at positions that are different from each other in the direction of travel of the recording medium 80. In the present embodiment, the second end face 70a is located on the rear side in the direction of travel of the recording medium 80 relative to the first end face 27a. The near-field light generating part 21g of the plasmon generator 21 is located between the first end face 27a and the second end face 70a. As shown in FIG. 17, the distance between the first end face 27a and the second end face 70a is denoted by reference letter D. The distance D is preferably in the range of 50 to 300 nm and more preferably in the range of 50 to 100 nm.

As shown in FIG. 17, the front end face 18a of the core 18 includes a first portion 18a1 located away from the medium facing surface 60 and a second portion 18a2 located in the medium facing surface 60. The second portion 18a2 is located on the rear side in the direction of travel of the recording medium 80 relative to the first portion 18a1. Further, there is a difference in level between the first portion 18a1 and the second portion 18a2. Note that the entire front end face 18a may be located away from the medium facing surface 60.

As shown in FIG. 17, the front end face 18a has a first edge E1 and a second edge E2 opposite to each other in the direction of travel of the recording medium 80 (the Z direction). The first edge E1 is located closer to the near-field light generating part 21g than is the second edge E2. The first edge E1 also serves as the front-side end of the first portion 18a1 in the direction of travel of the recording medium 80. The second edge E2 also serves as the rear-side end of the second portion 18a2 in the direction of travel of the recording medium 80.

In FIG. 17, the dotted line indicates the midpoint position between the first edge E1 and the second edge E2. This midpoint position will be denoted by reference letter C. Further, the front end face 18a is divided into two regions: a first region R1 extending from the midpoint position C to the first edge E1; and a second region R2 extending from the midpoint position C to the second edge E2. The first region R1 includes the first portion 18a1 and a part of the second portion 18a2. The second region R2 includes the remainder of the second portion 18a2.

The shield 70 overlaps only the first region R1 of the front end face 18a of the core 18 when viewed in the direction perpendicular to the medium facing surface 60 (the Y direction). The shield 70 particularly overlaps only the first portion 18a1 of the first region R1. A part of the rear end face 70b of the shield 70 is opposed to the first portion 18a1. The part of the rear end face 70b may or may not be in contact with the first portion 18a1. In the latter case, a part of the cladding may be interposed between the part of the rear end face 70b and the first portion 18a1.

The shield 70 includes an overlapping portion 71 which overlaps the first region R1 (the first portion 18a1) when viewed in the direction perpendicular to the medium facing surface 60, and further includes a first non-overlapping portion 72 and a second non-overlapping portion 73 located on opposite sides of the overlapping portion 71 in the track width direction (the X direction). In FIG. 20, the boundaries between the overlapping portion 71 and the first and second non-overlapping portions 72 and 73 are indicated in dotted lines. The length of the overlapping portion 71 in the direction perpendicular to the medium facing surface 60 is constant regardless of position in the track width direction.

The first and second non-overlapping portions 72 and 73 are located on opposite sides of the front end face 18a of the core 18 in the track width direction when viewed in the direction perpendicular to the medium facing surface 60. Thus, the first and second non-overlapping portions 72 and 73 do not overlap the front end face 18a. The maximum length of each of the first and second non-overlapping portions 72 and 73 in the direction perpendicular to the medium facing surface 60 is greater than the length of the overlapping portion 71 in that direction.

The top surface 70c of the shield 70 and the evanescent light generating surface 18b of the core 18 are coplanar. Alternatively, the top surface 70c and the evanescent light generating surface 18b may be located at different levels in the direction of travel of the recording medium 80 (the Z direction). The plasmon exciting part 21a of the plasmon generator 21 is located at a predetermined distance from each of the top surface 70c and the evanescent light generating surface 18b, and faces the top surface 70c and the evanescent light generating surface 18b. A part of the cladding layer 20 is interposed between the plasmon exciting part 21a and each of the top surface 70c and the evanescent light generating surface 18b.

The thermally-assisted magnetic recording head according to the present embodiment is not provided with the nonmagnetic layer 10, the insulating layer 52 and the magnetic layers 53 and 54. The cladding layer 17 lies on the middle shield layer 9. The magnetic layer 55 is embedded in the cladding layer 20, the dielectric layers 22, 25 and 26 and the insulating layer 23.

As has been described in the second embodiment section, the return path section R includes the first yoke portion 32, the second yoke portion 55A, the first columnar portion 56, the second columnar portion 59A, and the third columnar portion 59B. In the present embodiment, the second columnar portion 59A is formed only of the coupling portion 55B of the magnetic layer 55. The third columnar portion 59B is formed only of the coupling portion 55C of the magnetic layer 55.

As shown in FIG. 16, FIG. 19 and FIG. 20, the second columnar portion 59A and the third columnar portion 59B are located on opposite sides of the plasmon generator 21 in the track width direction and connected to the shield 70. The second yoke portion 55A is connected to the second end 56b of the first columnar portion 56, and connected to the shield 70 via the second and third columnar portions 59A and 59B.

The second columnar portion 59A is connected to the first non-overlapping portion 72. More specifically, a portion of the bottom surface 55b of the magnetic layer 55 that is included in the coupling portion 55B forming the second columnar portion 59A is in contact with a portion of the top surface 70c of the shield 70 that is included in the first non-overlapping portion 72. The third columnar portion 59B is connected to the second non-overlapping portion 73. More specifically, a portion of the bottom surface 55b of the magnetic layer 55 that is included in the coupling portion 55C forming the third columnar portion 59B is in contact with a portion of the top surface 70c of the shield 70 that is included in the second non-overlapping portion 73.

The specific functions and effects of the thermally-assisted magnetic recording head according to the present embodiment will now be described. The shield 70 has the same functions as those of the shield 51 described in the second embodiment section. Specifically, the shield 70 has the functions of; capturing a disturbance magnetic field applied to the thermally-assisted magnetic recording head from the outside thereof; capturing a magnetic flux that is produced from the first end face 27a of the main pole 27 and spreads in directions other than the direction perpendicular to the plane of the recording medium 80, and thereby preventing the magnetic flux from reaching the recording medium 80; and allowing a magnetic flux that has been produced from the first end face 27a of the main pole 27 and has magnetized a portion of the recording medium 80 to flow back to the main pole 27.

In the present embodiment, when viewed in the direction perpendicular to the medium facing surface 60, the shield 70 overlaps only the first region R1 of the front end face 18a of the core 18, the first region R1 being located closer to the main pole 27 than the other region of the front end face 18a. The present embodiment thus allows the first end face 27a of the main pole 27 and the second end face 70a of the shield 70 to be located closer to each other than in the second embodiment. More specifically, the present embodiment allows the first end face 27a and the second end face 70a to be in close proximity to each other easily so that the distance D falls within the range of 50 to 300 nm. Consequently, the present embodiment allows the above-described functions of the shield 70 to be effectively exerted to increase the write field intensity gradient. The lower limit of the distance D (50 nm) is a distance necessary to place the near-field light generating part 21g between the first end face 27a and the second end face 70a. To increase the write field intensity gradient, the distance D should be as small as possible. In view of the foregoing, the distance D is preferably in the range of 50 to 300 nm and more preferably in the range of 50 to 100 nm.

In the present embodiment, the near-field light generating part 21g of the plasmon generator 21 is located in the medium facing surface 60 and lies between the first end face 27a and the second end face 70a. This allows for producing a write magnetic field of a large write field intensity gradient in the vicinity of the near-field light generating part 21g. Consequently, the present embodiment allows for an increase in linear recording density.

If the shield 70 and the front end face 18a of the core 18 are opposed to each other over a large area, the light 50 propagating through the core 18 may pass through the front end face 18a and enter the shield 70, thereby causing the shield 70 to be heated and expand. This will result in the problem that the shield 70 will protrude toward the recording medium 80 and thus readily collide with the recording medium 80. In order to avoid this problem, the distance between the medium facing surface 60 and the recording medium 80 could be increased. However, this would lead to deterioration in write characteristics such as the overwrite property or to an increase in error rate. In contrast to this, the present embodiment is configured so that the shield 70 overlaps only the first region R1 of the front end face 18a when viewed in the direction perpendicular to the medium facing surface 60. More specifically, the shield 70 is not present between at least the second region R2 of the front end face 18a and the medium facing surface 60. The present embodiment thus prevents the shield 70 and the front end face 18a of the core 18 from being opposed to each other over a large area, thereby precluding the aforementioned problem.

To preclude the aforementioned problem with higher reliability, the region of the front end face 18a that the shield 70 overlaps when viewed in the direction perpendicular to the medium facing surface 60 may be only a region extending from a position that is located closer to the first edge E1 (not coinciding with the first edge E1) than is the midpoint position C to the first edge E1.

Further, in the present embodiment, the shield 70 is shaped to be greater in dimension in the track width direction (the X direction) than in dimension in the direction perpendicular to the top surface 1a of the substrate 1 (the Z direction). Consequently, even though the shield 70 overlaps only the first region R1 of the front end face 18a, it is possible to connect the second and third columnar portions 59A and 59B to two portions of the shield 70 that are opposite in the track width direction.

In the present embodiment, the shield 70 formed of a magnetic metal is provided on the leading side of the plasmon generator 21, particularly in the vicinity of the near-field light generating part 21g. Since the top surface 70c of the shield 70 is located close to the plasmon exciting part 21a of the plasmon generator 21, surface plasmons are excited also on the top surface 70c. Then, the electric line of force produced by the surface plasmons on the plasmon exciting part 21a and the electric line of force produced by the surface plasmons on the top surface 70c of the shield 70 are coupled to each other in the vicinity of the near-field light generating part 21g. This produces a high-density electric line of force in a narrow area in the vicinity of the near-field light generating part 21g. The spread of the near-field light generated by the near-field light generating part 21g is thereby suppressed. Thus, the shield 70 of the present embodiment has also the function of suppressing the spread of near-field light. By virtue of this function, the present embodiment allows for a reduction in track width to achieve an increase in recording density.

Further, in the present embodiment, the maximum length of each of the first and second non-overlapping portions 72 and 73 of the shield 70 in the direction perpendicular to the medium facing surface 60 is greater than the length of the overlapping portion 71 of the shield 70 in that direction. This feature of the present embodiment makes it possible to enhance the aforementioned function of the shield 70 while preventing magnetic flux from being saturated at some midpoint in the shield 70.

The remainder of configuration, function and effects of the present embodiment are similar to those of the second embodiment.

Fifth Embodiment

Figure 21:
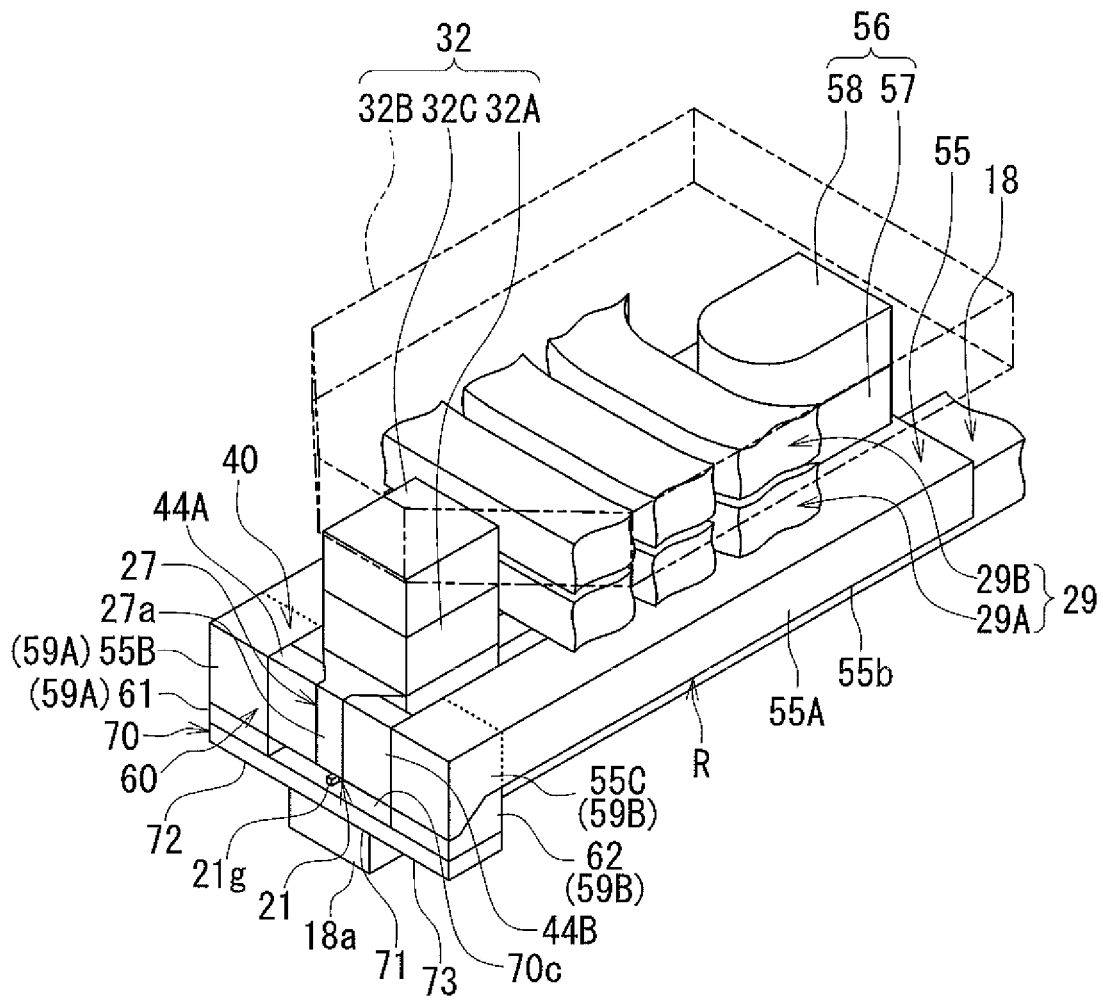
FIG. 21 is a perspective view showing the main part of a thermally-assisted magnetic recording head according to a fifth embodiment of the invention.

A thermally-assisted magnetic recording head according to a fifth embodiment of the invention will now be described with reference to FIG. 21. FIG. 21 is a perspective view showing the main part of the thermally-assisted magnetic recording head.

The thermally-assisted magnetic recording head according to the present embodiment is configured differently than the fourth embodiment as described below. In the thermally-assisted magnetic recording head according to the present embodiment, portions located on the front side in the direction of travel of the recording medium 80 relative to the plasmon generator 21 are configured in the same manner as the third embodiment. More specifically, the thermally-assisted magnetic recording head according to the present embodiment includes the two magnetic layers 61 and 62 described in the third embodiment section. In the present embodiment, the magnetic layers 61 and 62 penetrate the cladding layer 20, the dielectric layers 22, 25 and 26 and the insulating layer 23 (see FIG. 14 and FIG. 15), and connect the magnetic layer 55 and the shield 70 to each other. The bottom surface of the magnetic layer 61 is in contact with the portion of the top surface 70c of the shield 70 that is included in the first non-overlapping portion 72. The bottom surface of the magnetic layer 62 is in contact with the portion of the top surface 70c of the shield 70 that is included in the second non-overlapping portion 73. The second columnar portion 59A is constituted by the magnetic layer 61 and the coupling portion 55B of the magnetic layer 55. The third columnar portion 59B is constituted by the magnetic layer 62 and the coupling portion 55C of the magnetic layer 55.

The heat sink 40 of the present embodiment includes the two second portions 44A and 44B described in the third embodiment section, in place of the two second portions 43A and 43B of the fourth embodiment. Further, in the present embodiment, the first yoke portion 32 includes not only the first layer 32A and the second layer 32B but also the third layer 32C described in the third embodiment section. The thermally-assisted magnetic recording head further includes the insulating layers 38 and 39 of the third embodiment shown in FIG. 14. In the thermally-assisted magnetic recording head according to the present embodiment, the components of the portion located on the front side in the direction of travel of the recording medium 80 relative to the plasmon generator 21 are shaped and arranged in the same manner as the third embodiment.

The remainder of configuration, function and effects of the present embodiment are similar to those of the third or fourth embodiment.

Sixth Embodiment

Figure 22:
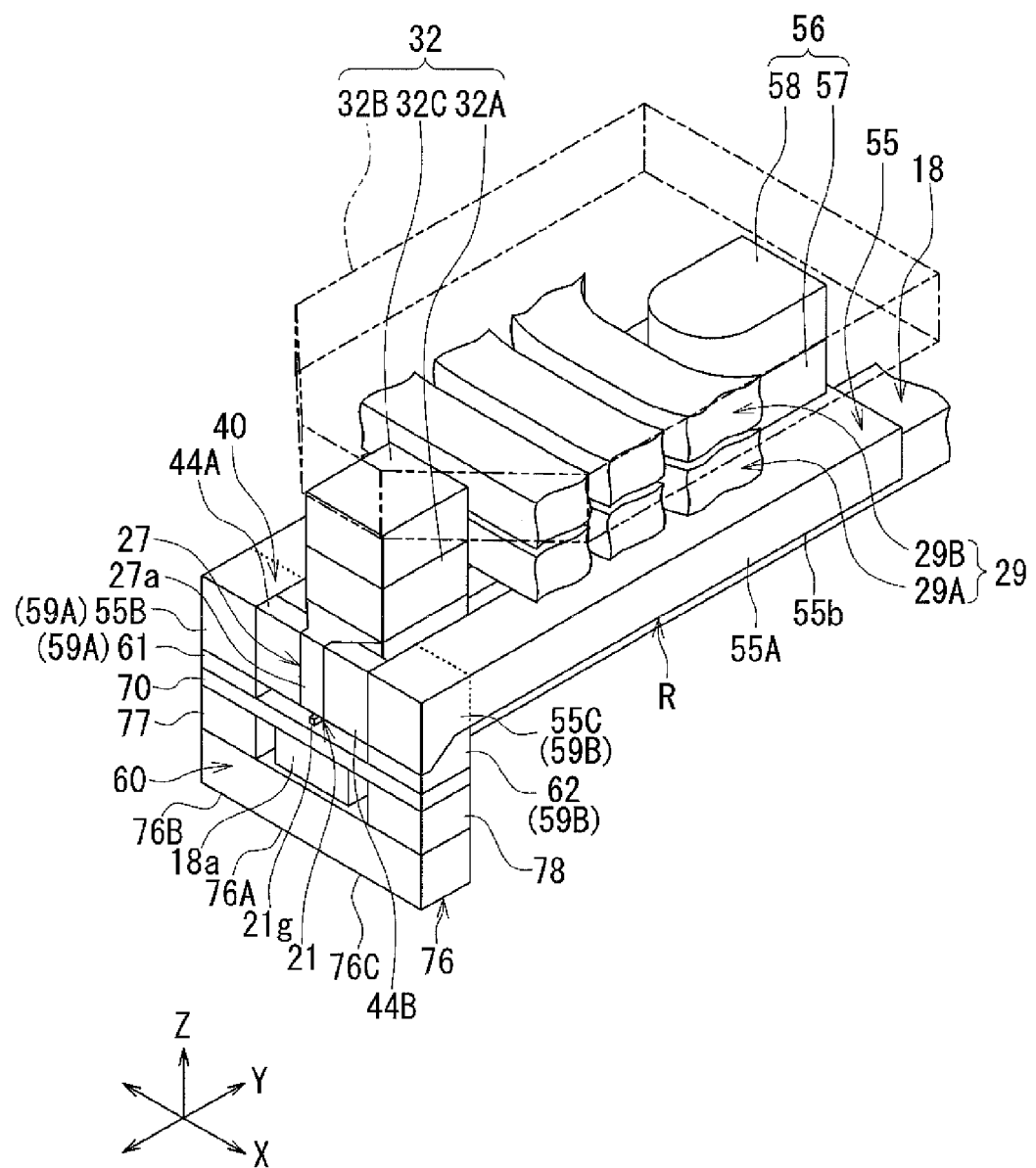
FIG. 22 is a perspective view showing the main part of a thermally-assisted magnetic recording head according to a sixth embodiment of the invention.
Figure 23:
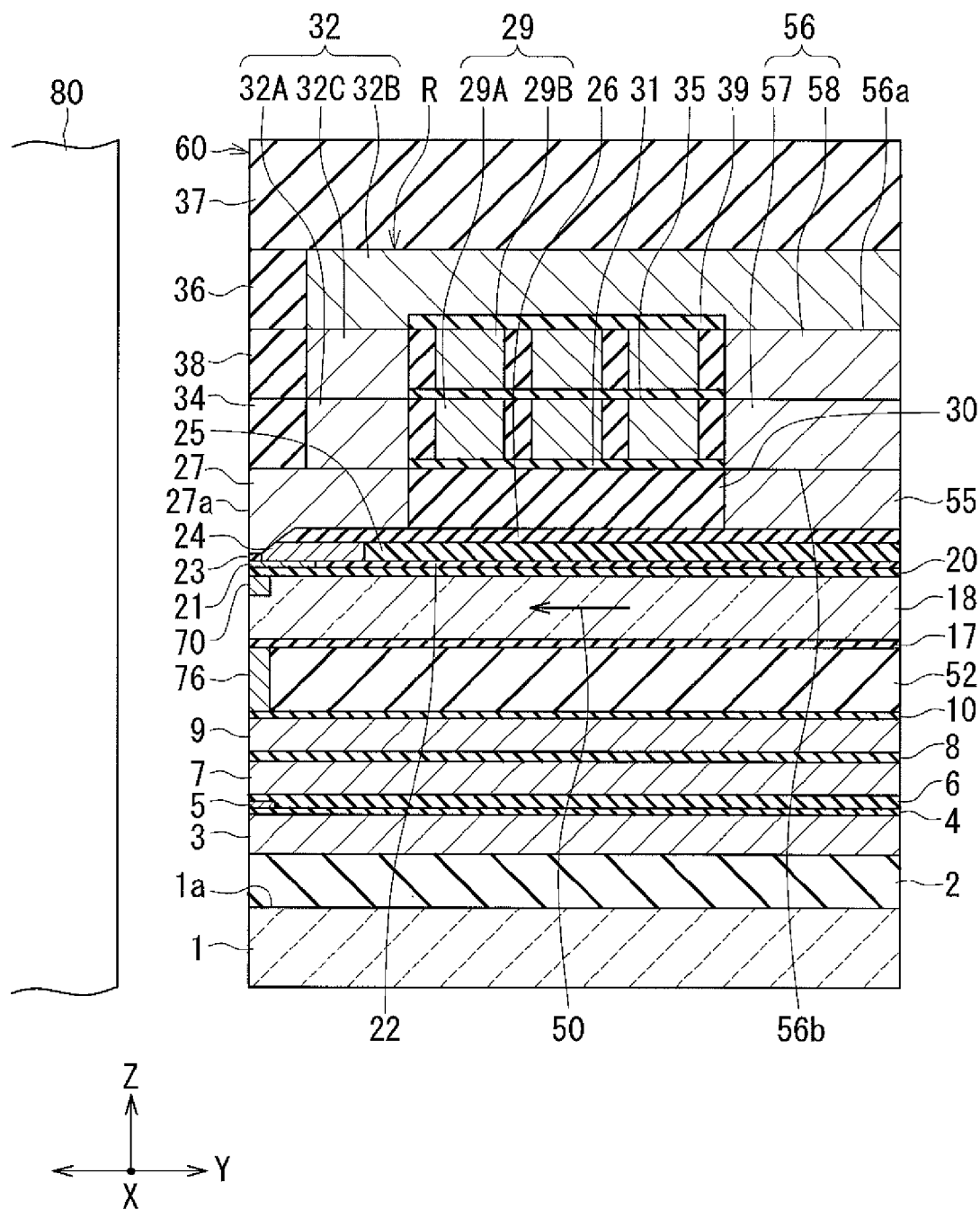
FIG. 23 is a cross-sectional view showing the configuration of the thermally-assisted magnetic recording head according to the sixth embodiment of the invention.
Figure 24:
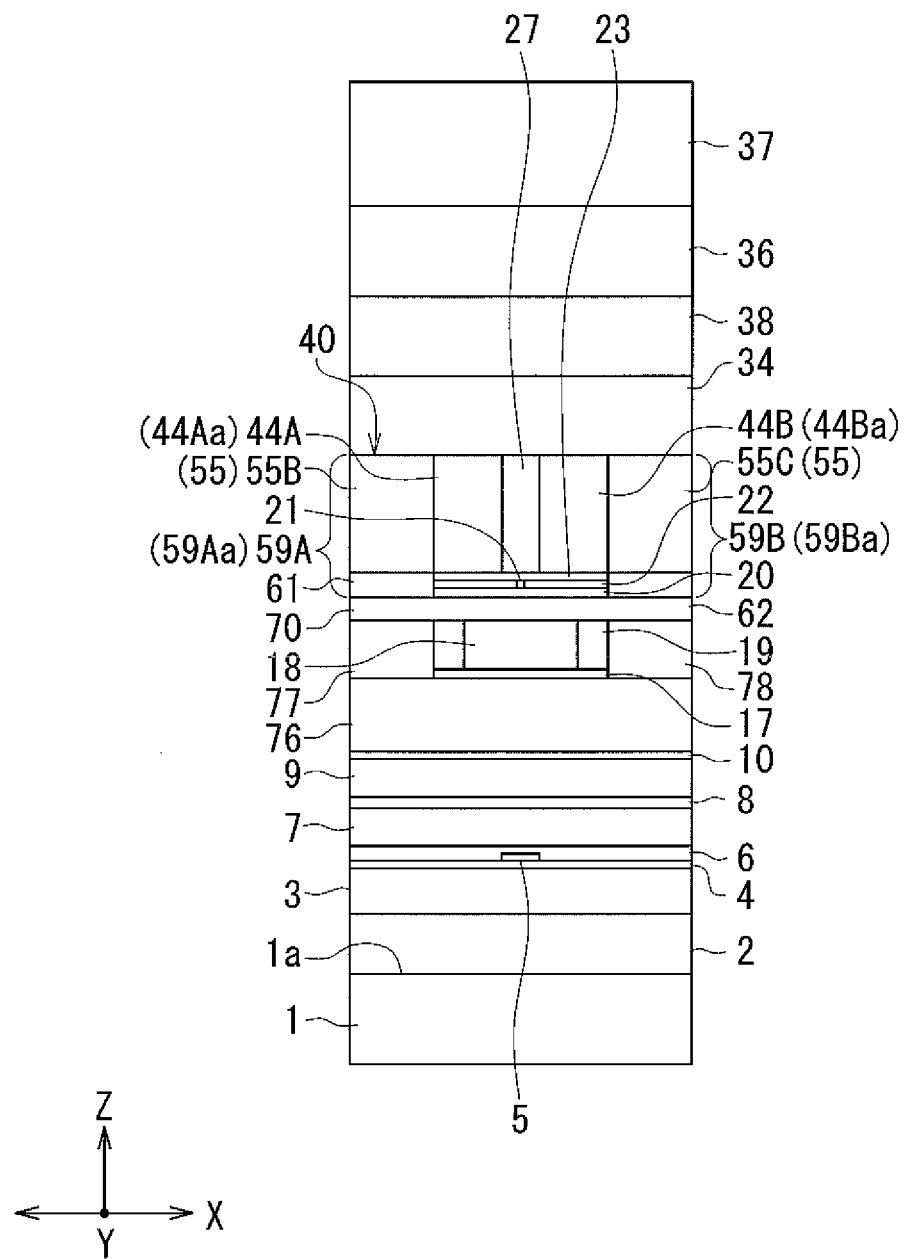
FIG. 24 is a front view showing the medium facing surface of the thermally-assisted magnetic recording head according to the sixth embodiment of the invention.

A thermally-assisted magnetic recording head according to a sixth embodiment of the invention will now be described with reference to FIG. 22 to FIG. 24. FIG. 22 is a perspective view showing the main part of the thermally-assisted magnetic recording head. FIG. 23 is a cross-sectional view showing the configuration of the thermally-assisted magnetic recording head. FIG. 24 is a front view showing the medium facing surface of the thermally-assisted magnetic recording head.

The configuration of the thermally-assisted magnetic recording head according to the present embodiment differs from the fifth embodiment in the following ways. The thermally-assisted magnetic recording head according to the present embodiment includes the nonmagnetic layer 10 and the insulating layer 52 described in the first and second embodiment sections, and further includes a sub-shield 76, a fourth columnar portion 77, and a fifth columnar portion 78, each of the sub-shield 76 and the fourth and fifth columnar portions 77 and 78 being formed of a magnetic material. The sub-shield 76 is shaped and located in the same manner as the shield 51 of the second embodiment. More specifically, the sub-shield 76 is disposed on the nonmagnetic layer 10 and has a front end face located in the medium facing surface 60, a rear end face opposite to the front end face, and a top surface. In addition, the sub-shield 76 includes a central portion 76A, and further includes a first side portion 76B and a second side portion 76C located on opposite sides of the central portion 76A in the track width direction (the X direction). The length of the central portion 76A in the direction perpendicular to the medium facing surface 60 is constant regardless of position in the track width direction. The maximum length of each of the side portions 76B and 76C in the direction perpendicular to the medium facing surface 60 is greater than the length of the central portion 76A in that direction.

The fourth and fifth columnar portions 77 and 78 are located in the vicinity of the medium facing surface 60 at positions on opposite sides of the core 18 in the track width direction. The fourth and fifth columnar portions 77 and 78 penetrate the cladding layers 17 and 19, and connect the shield 70 and the sub-shield 76 to each other. Each of the fourth and fifth columnar portions 77 and 78 has a front end face located in the medium facing surface 60, a top surface, and a bottom surface. The top surface of the fourth columnar portion 77 is in contact with a portion of the bottom surface of the shield 70 that is included in the first non-overlapping portion 72 (see FIG. 20). The bottom surface of the fourth columnar portion 77 is in contact with a portion of the top surface of the sub-shield 76 that is included in the first side portion 76B. The top surface of the fifth columnar portion 78 is in contact with a portion of the bottom surface of the shield 70 that is included in the second non-overlapping portion 73 (see FIG. 20). The bottom surface of the fifth columnar portion 78 is in contact with a portion of the top surface of the sub-shield 76 that is included in the second side portion 76C.

The sub-shield 76 has the same functions as those of the shield 70 described in the fourth embodiment section. Specifically, the sub-shield 76 has the functions of capturing a disturbance magnetic field applied to the thermally-assisted magnetic recording head from the outside thereof; capturing a magnetic flux that is produced from the first end face 27a of the main pole 27 and spreads in directions other than the direction perpendicular to the plane of the recording medium 80, and thereby preventing the magnetic flux from reaching the recording medium 80; and allowing a magnetic flux that has been produced from the first end face 27a of the main pole 27 and has magnetized a portion of the recording medium 80 to flow back to the main pole 27. Further, the sub-shield 76, the fourth columnar portion 77 and the fifth columnar portion 78 have the function of preventing magnetic flux from being saturated in the shield 70. The present embodiment thus allows for further enhancement of the functions of the shield 70 described in the fourth embodiment section.

In the present embodiment, the portions located on the front side in the direction of travel of the recording medium 80 relative to the plasmon generator 21 may be configured in the same manner as the fourth embodiment. The remainder of configuration, function and effects of the present embodiment are similar to those of the fourth or fifth embodiment.

The present invention is not limited to the foregoing embodiments, and various modifications may be made thereto. For example, as far as the requirements of the appended claims are met, the shape and location of the main pole, and the number, shape and location of each of the first and second portions of the heat sink 40 are not limited to the respective examples illustrated in the foregoing embodiments but can be chosen as desired.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A thermally-assisted magnetic recording head comprising:
   a medium facing surface configured to face a recording medium;
   a coil configured to produce a magnetic field corresponding to data to be written on the recording medium;
   a main pole having a first end face located in the medium facing surface, the main pole being configured to allow a magnetic flux that corresponds to the magnetic field produced by the coil to pass, and configured to produce a write magnetic field for writing the data on the recording medium;
   a waveguide including a core through which light propagates, and a cladding provided around the core;
   a plasmon generator including a near-field light generating part located in the medium facing surface; and
   a heat sink, wherein
   the first end face and the near-field light generating part are located at positions that are different from each other in a direction of travel of the recording medium,
   the plasmon generator is configured so that a surface plasmon is excited on the plasmon generator based on the light propagating through the core, and the near-field light generating part generates near-field light based on the surface plasmon,
   the heat sink includes at least one first portion and at least one second portion, each of the at least one first portion and the at least one second portion having an end face located in the medium facing surface,
   the at least one first portion is located on an outward side of the main pole in a track width direction and spaced from the main pole,
   at least part of the at least one second portion is located between the main pole and the at least one first portion,
   each of the main pole and the at least one first portion is formed of a magnetic metal, and
   the at least one second portion is formed of a nonmagnetic metal.

2. The thermally-assisted magnetic recording head according to claim 1, wherein the magnetic metal used to form the main pole and the magnetic metal used to form the at least one first portion are the same.

3. The thermally-assisted magnetic recording head according to claim 1, wherein the nonmagnetic metal is one of Au, Ag, Al, Cu, Mo, W, Ir, Ru, Rh, Cr, Pd, and Pt.

4. The thermally-assisted magnetic recording head according to claim 1, wherein
the core has an evanescent light generating surface configured to generate evanescent light based on the light propagating through the core,
the plasmon generator includes a plasmon exciting part located at a predetermined distance from the evanescent light generating surface and facing the evanescent light generating surface, and
in the plasmon generator, the surface plasmon is excited on the plasmon exciting part through coupling with the evanescent light generated by the evanescent light generating surface, the surface plasmon propagates to the near-field light generating part, and the near-field light generating part generates the near-field light based on the surface plasmon.

5. The thermally-assisted magnetic recording head according to claim 1, wherein
the at least one first portion is two first portions that are located on opposite sides of the main pole in the track width direction and are each spaced from the main pole, and
the at least one second portion is two second portions, at least part of each of the two second portions being located between the main pole and a corresponding one of the two first portions.

6. The thermally-assisted magnetic recording head according to claim 5, further comprising:
a shield formed of a magnetic material and having a second end face located in the medium facing surface: and
a return path section formed of a magnetic material, connecting the main pole and the shield to each other, and allowing a magnetic flux that corresponds to the magnetic field produced by the coil to pass, wherein
the first end face and the second end face are located at positions that are different from each other in the direction of travel of the recording medium,
the near-field light generating part is located between the first end face and the second end face,
the return path section includes a first yoke portion, a second yoke portion, a first columnar portion, a second columnar portion, and a third columnar portion,
the first yoke portion, the second yoke portion and the first columnar portion are located on a same side in the direction of travel of the recording medium relative to the core,
the first columnar portion is located away from the medium facing surface and has a first end and a second end opposite to each other in the direction of travel of the recording medium,
the second and third columnar portions are located closer to the medium facing surface than is the first columnar portion,
the first yoke portion connects the main pole to the first end of the first columnar portion,
the second columnar portion and the third columnar portion are located on opposite sides of the plasmon generator in the track width direction, and connected to the shield,
the second yoke portion is connected to the second end of the first columnar portion, and connected to the shield via the second and third columnar portions,
the coil is wound around the first columnar portion, and
the second and third columnar portions constitute the two first portions.

7. The thermally-assisted magnetic recording head according to claim 6, wherein
the core has a front end face facing toward the medium facing surface,
the front end face has a first edge and a second edge opposite to each other in the direction of travel of the recording medium,
the first edge is located closer to the near-field light generating part than is the second edge, and
when the front end face is divided into two regions: a first region extending from a midpoint position between the first edge and the second edge to the first edge; and a second region extending from the midpoint position to the second edge, the shield overlaps only the first region of the front end face when viewed in a direction perpendicular to the medium facing surface.

8. The thermally-assisted magnetic recording head according to claim 7, wherein
the shield includes a first non-overlapping portion and a second non-overlapping portion that are located on opposite sides of the front end face of the core in the track width direction when viewed in the direction perpendicular to the medium facing surface,
the second columnar portion is connected to the first non-overlapping portion, and
the third columnar portion is connected to the second non-overlapping portion.

9. The thermally-assisted magnetic recording head according to claim 7, wherein the first end face and the second end face are at a distance of 50 to 300 nm from each other.

* * * * *